US010279798B2

(12) United States Patent
Kato et al.

(10) Patent No.: US 10,279,798 B2
(45) Date of Patent: May 7, 2019

(54) HYBRID VEHICLE AND CONTROL METHOD OF HYBRID VEHICLE

(71) Applicant: Toyota Jidosha Kabushiki Kaisha, Toyota-shi, Aichi-ken (JP)

(72) Inventors: Shunya Kato, Seto (JP); Ikuo Ando, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 207 days.

(21) Appl. No.: 15/612,377

(22) Filed: Jun. 2, 2017

(65) Prior Publication Data

US 2017/0349160 A1 Dec. 7, 2017

(30) Foreign Application Priority Data

Jun. 7, 2016 (JP) .................................. 2016-113665

(51) Int. Cl.
*B60K 6/445* (2007.10)
*B60W 20/10* (2016.01)
(Continued)

(52) U.S. Cl.
CPC ............. *B60W 20/10* (2013.01); *B60K 6/365* (2013.01); *B60K 6/445* (2013.01); *B60K 6/547* (2013.01);
(Continued)

(58) Field of Classification Search
CPC ...... B60W 20/10; B60W 20/11; B60W 10/10; B60W 30/18127; B60W 10/115; B60W 10/18; B60W 10/08; B60W 30/18109; B60W 10/06; B60W 2540/12; B60W 2510/0638; B60W 2710/0644; B60W 2510/1005; B60W 2510/182; B60W 2520/10; B60W 2520/105; B60W 2550/142; B60W 2710/08; B60W 2710/1005; B60W 2710/182; B60K 6/445; B60K 6/365; B60K 6/547; Y02T 10/6286; Y02T 10/6239; Y02T 10/7258; B60Y 2300/60; B60Y 2300/18108; B60Y 2300/181; B60Y 2200/92; B60Y 2300/43;
(Continued)

(56) References Cited

U.S. PATENT DOCUMENTS 6,109,237 A * 8/2000 Pels .................... B60K 6/485
123/339.11
2010/0029442 A1 * 2/2010 Ito ....................... B60K 6/445
477/183
(Continued)

FOREIGN PATENT DOCUMENTS

JP 2014-144659 A 8/2014

*Primary Examiner* — Alan D Hutchinson
(74) *Attorney, Agent, or Firm* — Dinsmore & Shohl LLP

(57) ABSTRACT

When a brake is turned on during travel of a hybrid vehicle, a required braking force required for a drive shaft is set based on a brake depression amount, a base rotation speed of an engine is set based on the required braking force, a shift stage is set based on the base rotation speed and a vehicle speed, a target rotation speed of the engine is set based on the shift stage and the vehicle speed, and the engine, the first motor, and the second motor are controlled such that the engine operates at the target rotation speed and the required braking force acts on the drive shaft.

12 Claims, 16 Drawing Sheets

(51) Int. Cl.
*B60K 6/365* (2007.10)
*B60K 6/547* (2007.10)
*B60W 10/06* (2006.01)
*B60W 10/08* (2006.01)
*B60W 10/115* (2012.01)
*B60W 10/18* (2012.01)
*B60W 30/18* (2012.01)
*B60W 10/10* (2012.01)
*B60W 20/11* (2016.01)

(52) U.S. Cl.
CPC ............ *B60W 10/06* (2013.01); *B60W 10/08* (2013.01); *B60W 10/10* (2013.01); *B60W 10/115* (2013.01); *B60W 10/18* (2013.01); *B60W 20/11* (2016.01); *B60W 30/18109* (2013.01); *B60W 30/18127* (2013.01); *B60W 2510/0638* (2013.01); *B60W 2510/1005* (2013.01); *B60W 2510/182* (2013.01); *B60W 2520/10* (2013.01); *B60W 2520/105* (2013.01); *B60W 2540/12* (2013.01); *B60W 2550/142* (2013.01); *B60W 2710/0644* (2013.01); *B60W 2710/08* (2013.01); *B60W 2710/1005* (2013.01); *B60W 2710/182* (2013.01); *B60Y 2200/92* (2013.01); *B60Y 2300/181* (2013.01); *B60Y 2300/18108* (2013.01); *B60Y 2300/43* (2013.01); *B60Y 2300/60* (2013.01); *B60Y 2400/73* (2013.01); *Y02T 10/6239* (2013.01); *Y02T 10/6286* (2013.01); *Y02T 10/7258* (2013.01); *Y10S 903/919* (2013.01); *Y10S 903/93* (2013.01)

(58) Field of Classification Search
CPC . B60Y 2400/73; Y10S 903/93; Y10S 903/919
See application file for complete search history.

(56) References Cited

U.S. PATENT DOCUMENTS

| | | | |
|---|---|---|---|
| 2010/0248895 A1* | 9/2010 | Jozaki | F16H 61/66259 477/44 |
| 2012/0094803 A1* | 4/2012 | Hyodo | E02F 9/2025 477/173 |
| 2012/0296544 A1* | 11/2012 | Kondoh | B60W 50/0205 701/99 |
| 2013/0157806 A1* | 6/2013 | Koyama | B60W 20/30 477/5 |
| 2018/0320783 A1* | 11/2018 | Lindstrom | B60K 1/02 |

* cited by examiner

HYBRID VEHICLE AND CONTROL METHOD OF HYBRID VEHICLE

CROSS-REFERENCE TO RELATED APPLICATIONS

This application claims priority to Japanese Patent Application No. 2016-113665 filed on Jun. 7, 2016 which is incorporated herein by reference in its entirety including the specification, drawings and abstract.

BACKGROUND

1. Technical Field

The disclosure relates to a hybrid vehicle and a control method of a hybrid vehicle.

2. Description of Related Art

Japanese Patent Application Publication No. 2014-144659 (JP 2014-144659 A) discloses a hybrid vehicle including a planetary gear mechanism of which three rotary elements are connected to an engine, a first motor, and a second motor. In the hybrid vehicle, the rotary element connected to the second motor is connected to a drive shaft connected to vehicle wheels via a stepped gearshift. Driving of such a hybrid vehicle is basically controlled as follows. First, a required driving force is set based on an accelerator depression amount by a driver and a vehicle speed. Then, the required driving force is multiplied by a rotation speed of the drive shaft to calculate a required power to be output from the engine. Then, a target rotation speed of the engine is set based on the required power and an operation line of the engine in which fuel efficiency is optimal (a fuel efficiency optimal operation line). Then, the engine, the first motor, the second motor, and the stepped gearshift are controlled such that the engine rotates at the target rotation speed to output the required power and the required driving force is output to the drive shaft for the hybrid vehicle to travel.

SUMMARY

In the above-mentioned hybrid vehicle, an operating point of the engine can be freely set regardless of a shift stage of the stepped gearshift. Accordingly, when a driver steps on a brake pedal, a change in engine rotation speed may not match a change in vehicle speed. Even when the shift stage of the stepped gearshift changes, the rotation speed of the engine may not change. In this case, there is a possibility that a driver will feel discomfort due to a driving feeling of the above-mentioned hybrid vehicle is different from a driving feeling of a vehicle including only an engine as a drive source and a stepped gearshift disposed between the engine and the axle. This discomfort may be caused in the same way as when a virtual speed level shift is performed in a hybrid vehicle not including a stepped gearshift.

The disclosure provides a hybrid vehicle and a control method of a hybrid vehicle that can give a better driving feeling to a driver when a brake is turned on during travel.

A first aspect of the disclosure provides a hybrid vehicle. The hybrid vehicle includes an engine, a first motor, a planetary gear mechanism, a second motor, a battery, and an electronic control unit. The planetary gear mechanism includes three rotary elements. The three rotary elements are connected to three shafts respectively. The three shafts are an output shaft of the engine, a rotary shaft of the first motor, and a drive shaft connected to an axle. The second motor is configured to input and output a power to and from the drive shaft. The battery is configured to exchange electric power with the first motor and the second motor. As a result of the electronic control unit determining a brake is turned on during travel of the hybrid vehicle, the electronic control unit is configured to: set a required braking force required for the drive shaft based on a brake depression amount; set a base rotation speed of the engine based on the required braking force; set a shift stage based on the base rotation speed and a vehicle speed; set a target rotation speed of the engine based on the shift stage and the vehicle speed; and control the engine, the first motor, and the second motor such that the engine operates at the target rotation speed and the required braking force acts on the drive shaft.

According to this configuration, when the brake is turned on during travel of the hybrid vehicle, the required braking force required for a drive shaft is set based on the brake depression amount, the base rotation speed of the engine is set based on the required braking force, the shift stage is set based on the base rotation speed and the vehicle speed, the target rotation speed of the engine is set based on the shift stage and the vehicle speed, and the engine, the first motor, and the second motor are controlled such that the engine operates at the target rotation speed and the required braking force acts on the drive shaft. Accordingly, it is possible to set the rotation speed of the engine to a rotation speed corresponding to (matching) the shift stage and the vehicle speed. It is also possible to give a feeling of change in speed to a driver when the shift stage changes. As a result, it is possible to give a better driving feeling to a driver.

In the hybrid vehicle, as the electronic control unit determining that the brake is turned on, the electronic control unit may be configured to: set a braking level based on the required braking force; and set the base rotation speed such that the base rotation speed when the braking level is high is higher than the base rotation speed when the braking level is low. According to this configuration, it is possible to set the base rotation speed based on a braking level reflecting the required braking force.

In the hybrid vehicle, as a result of an electronic control unit determining that: (i) the braking level is a first level, which occurs when the brake is turned on; and (ii) the required braking force is equal to or greater than a first braking force for a first predetermined time or longer, the electronic control unit may be configured to switch the braking level to a second level higher than a first level. As a result of an electronic control unit determining that: (iii) the braking level is the second level, which occurs when the brake is turned on; and (iv) the required braking force is less than a second braking force for a second predetermined time or longer, the second braking force is equal to or less than the first braking force, the electronic control unit may be configured to switch the braking level to the first level. According to this configuration, it is possible to prevent the braking level from being switched due to instantaneous fluctuation of the required braking force.

In the hybrid vehicle, the first braking force may be set to decrease as a road surface gradient increases on an uphill road. As the road surface gradient increases on an uphill road, a deceleration of a vehicle is likely to increase with respect to the same required braking force. Accordingly, by setting the first braking force in this way, it is possible to appropriately switch the braking level from the first level to the second level in consideration of the road surface gradient (the deceleration of the vehicle).

In the hybrid vehicle, as a result of an electronic control unit determining that: (j) the braking level is one of the first level and the second level, which occurs when the brake is turned on; and (ii) the required braking force is equal to or greater than a third braking force, the third braking force is equal to or greater than the second braking force; and (iii) an increase in the required braking force is equal to or greater than a predetermined increase, the electronic control unit may be configured to switch the braking level to a third level. As a result of the electronic control unit determining that: (iv) the braking level is the third level, which occurs when the brake is turned on; and (ii) the required braking force is less than the second braking force for the second predetermined time or longer, the electronic control unit may be configured to switch the braking level to the first level. According to this configuration, it is possible to more appropriately set the braking level in consideration of the increase in the required braking force as well as the required braking force.

In the hybrid vehicle, as a result of the electronic control unit determining that the brake is turned on, the electronic control unit may be configured to: set a temporary shift stage based on the vehicle speed; set a post-downshift rotation speed based on the vehicle speed, the post-downshift rotation speed is the rotation speed of the engine at a shift stage one step lower than a current shift stage; set the current shift stage as an upper-limit shift stage when the post-downshift rotation speed is higher than the base rotation speed; set a shift stage one step lower than the current shift stage as the upper-limit shift stage when the post-downshift rotation speed is equal to or lower than the base rotation speed; and set the smaller of the temporary shift stage and the upper-limit shift stage as the shift stage. According to this configuration, it is possible to determine whether to maintain or downshift the shift stage using the upper-limit shift stage based on a magnitude relationship between the post-downshift rotation speed and the base rotation speed. When the upper-limit shift stage decreases, the upper-limit shift stage decreases by one step (step by step). Accordingly, the shift stage decreases by one step and it is thus possible to prevent a change in the rotation speed of the engine from excessively increasing.

In the hybrid vehicle, as a result of the electronic control unit determining that: (i) the post-downshift rotation speed is equal to or lower than the base rotation speed when the electronic control unit determines that the brake is turned on; and (ii) a duration of the current shift stage is less than a third predetermined time, the electronic control unit may be configured to set the current shift stage as the upper-limit shift stage. According to this configuration, it is possible to prevent the duration of each shift stage from being excessively shortened and to prevent riding quality from degrading.

In the hybrid vehicle, as a result of the electronic control unit determining that the brake is turned on, the electronic control unit may be configured to set the base rotation speed such that the base rotation speed when the vehicle speed is low is less than the base rotation speed when the vehicle speed is high. According to this configuration, when the vehicle speed is relatively low, it is possible to prevent the engine rotation speed from excessively increasing.

In the hybrid vehicle, as a result of the electronic control unit determining that an accelerator of the hybrid vehicle is turned on, the electronic control unit may be configured to: set a required driving force required for the drive shaft based on an accelerator depression amount; set the shift stage based on the accelerator depression amount and the vehicle speed; set the target rotation speed based on the vehicle speed and the shift stage; set an upper-limit driving force, the upper-limit driving force being a driving force when an upper-limit power which is output from the engine when the engine rotates at the target rotation speed is output to the drive shaft; and control the engine, the first motor, and the second motor such that the smaller driving force of the upper-limit driving force and the required driving force is output to the drive shaft and the engine rotates at the target rotation speed. According to this configuration, when the accelerator is turned on, it is possible to set the engine rotation speed to a rotation speed corresponding to the vehicle speed and the shift stage. When the shift stage is changed, it is possible to give a feeling of change in speed to a driver. As a result, it is possible to give a better driving feeling to a driver when the accelerator is turned on.

In the hybrid vehicle, the shift stage may be a virtual shift stage. The hybrid vehicle may further include a stepped gearshift which is attached between the drive shaft and the planetary gear mechanism. The shift stage may be a shift stage of the stepped gearshift or a shift stage obtained by adding a virtual shift stage to the shift stage of the stepped gearshift. Here, the "shift stage obtained by adding a virtual shift stage to the shift stage of the stepped gearshift" indicates that the shift stages of the stepped gearshift and the virtual shift stages are combined to achieve a total of four shift stages by adding virtual shift stages in two steps to the shift stages of the stepped gearshift in two steps and to achieve a total of six shift stages by adding the virtual shift stages in two steps to the shift stages of the stepped gearshift in three steps. Accordingly, it is possible to utilize a desired number of shift stages.

A second aspect of the disclosure provides a control method of a hybrid vehicle. The hybrid vehicle includes an engine, a first motor, a planetary gear mechanism including three rotary elements, a second motor, a battery, and an electronic control unit. The three rotary elements are connected to three shafts respectively. The three shafts are an output shaft of the engine, a rotary shaft of the first motor, and a drive shaft connected to an axle. The second motor is configured to input and output a power to and from the drive shaft. The battery is configured to exchange electric power with the first motor and the second motor. The control method includes determining, by the electronic control unit, whether or not a brake of the hybrid vehicle is turned on during travel of the hybrid vehicle. As a result of the electronic control unit determining that the brake is turned on, the control method further includes: setting, by the electronic control unit, a required braking force required for the drive shaft based on a brake depression amount; setting by the electronic control unit, a base rotation speed of the engine based on the required braking force; setting, by the electronic control unit, a shift stage based on the base rotation speed and a vehicle speed; setting, by the electronic control unit, a target rotation speed of the engine based on the shift stage and the vehicle speed; and controlling, by the electronic control unit, the engine, the first motor, and the second motor such that the engine operates at the target rotation speed and the required braking force acts on the drive shaft.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments of the disclosure will be described below with reference to the accompanying drawings.

Figure 1:
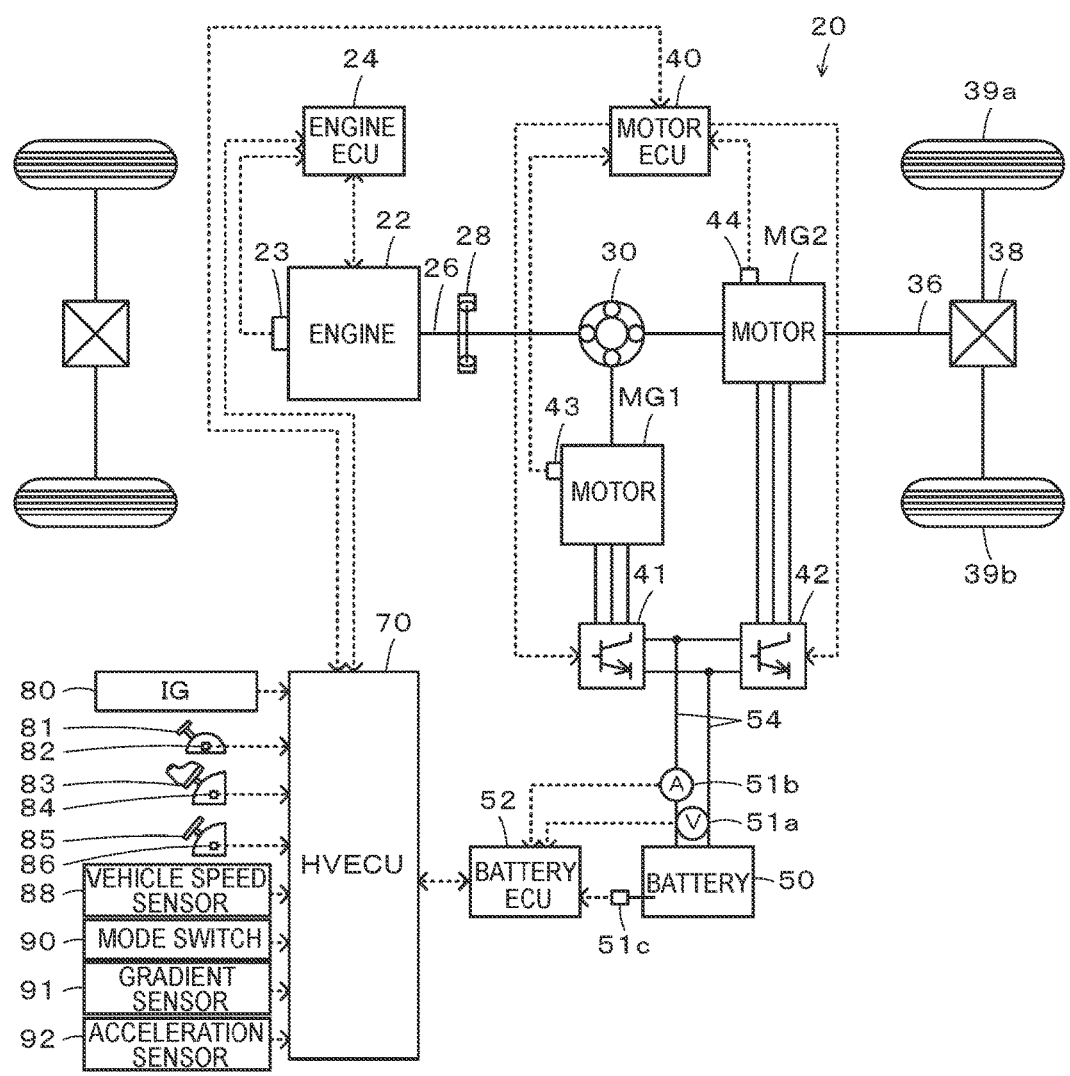
FIG. 1 is a diagram schematically illustrating a configuration of a hybrid vehicle 20 according to a first embodiment.

FIG. 1 is a diagram schematically illustrating a configuration of a hybrid vehicle 20 according to a first embodiment. As illustrated in the drawing, the hybrid vehicle 20 according to the first embodiment includes an engine 22, a planetary gear 30, motors MG1 and MG2, inverters 41 and 42, a battery 50, and a hybrid electronic control unit (hereinafter referred to as an "HVECU") 70.

The engine 22 is constituted by an internal combustion engine that outputs power using gasoline, diesel, or the like as fuel. Operation of the engine 22 is controlled by an engine electronic control unit (hereinafter referred to as an "engine ECU") 24.

Although not illustrated in the drawing, the engine ECU 24 is constituted by a microprocessor centered on a CPU and includes a ROM that stores a processing program, a RAM that temporarily stores data, input and output ports, and a communication port in addition to the CPU. Signals from various sensors required for controlling the operation of the engine 22 are input to the engine ECU 24 via the input port. Examples of the signals input to the engine ECU 24 include a crank angle $\theta cr$ from a crank position sensor 23 that detects a rotational position of a crank shaft 26 of the engine 22 and a throttle opening level TH from a throttle valve position sensor that detects a position of a throttle valve. Various control signals for controlling the operation of the engine 22 are output from the engine ECU 24 via the output port. Examples of the signals output from the engine ECU 24 include a drive control signal to a throttle motor that adjusts the position of the throttle valve, a drive control signal to a fuel injection valve, and a drive control signal to an ignition coil integrated with an igniter. The engine ECU 24 is connected to the HVECU 70 via the communication port, and controls the operation of the engine 22 using a control signal from the HVECU 70. The engine ECU 24 outputs data on an operating state of the engine 22 to the HVECU 70 when it is necessary. The engine ECU 24 calculates a rotation speed of the crank shaft 26, that is, a rotation speed Ne of the engine 22, based on the crank angle $\theta cr$ from the crank position sensor 23.

The planetary gear 30 is constituted by a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via a damper 28. The sun gear, the ring gear, and the carrier are examples of three rotary elements.

The motor MG1 is constituted, for example, by a synchronous generator-motor and the rotor thereof is connected to the sun gear of the planetary gear 30 as described above. The motor MG2 is constituted, for example, by a synchronous generator-motor and the rotor thereof is connected to the drive shaft 36. The inverters 41 and 42 are connected to the battery 50 via power lines 54. The motors MG1 and MG2 are rotationally driven by controlling switching of a plurality of switching elements, which are not illustrated, of the inverters 41 and 42 by a motor electronic control unit (hereinafter referred to as a "motor ECU") 40.

Although not illustrated in the drawing, the motor ECU 40 is constituted by a microprocessor centered on a CPU and includes a ROM that stores a processing program, a RAM that temporarily stores data, input and output ports, and a communication port in addition to the CPU. Signals from various sensors required for controlling driving of the motors MG1 and MG2 are input to the motor ECU 40 via the input port. Examples of the signals input to the motor ECU 40 include rotational positions $\theta m1$ and $\theta m2$ from rotational position sensors 43 and 44 that detect rotational positions of the rotors of the motors MG1 and MG2 and phase currents from current sensors that detect currents flowing in phases of the motors MG1 and MG2. Switching control signals to switching elements, which are not illustrated, of the inverters 41 and 42 are output from the motor ECU 40 via the output port. The motor ECU 40 is connected to the HVECU 70 via the communication port, controls driving of the motors MG1 and MG2 using a control signal from the HVECU 70, and outputs data on driving states of the motors MG1 and MG2 to the HVECU 70 when it is necessary. The motor ECU 40 calculates rotation speeds Nm1 and Nm2 of the motors MG1 and MG2 based on the rotational positions θm1 and θm2 of the rotors of the motors MG1 and MG2 from the rotational position sensors 43 and 44.

The battery 50 is constituted, for example, by a lithium ion secondary battery or a nickel hydride secondary battery and is connected to the inverters 41 and 42 via the power lines 54. The battery 50 is managed by a battery electronic control unit (hereinafter referred to as a "battery ECU") 52.

Although not illustrated in the drawing, the battery ECU 52 is constituted by a microprocessor centered on a CPU and includes a ROM that stores a processing program, a RAM that temporarily stores data, input and output ports, and a communication port in addition to the CPU. Signals from various sensors required for managing the battery 50 are input to the battery ECU 52 via the input port. Examples of the signals input to the battery ECU 52 include a battery voltage Vb from a voltage sensor 51a disposed between terminals of the battery 50, a battery current Ib from a current sensor 51b attached to an output terminal of the battery 50, and a battery temperature Tb from a temperature sensor 51c attached to the battery 50. The battery ECU 52 is connected to the HVECU 70 via the communication port and outputs data on a state of the battery 50 to the HVECU 70 when it is necessary. The battery ECU 52 calculates a power storage ratio SOC based on an integrated value of the battery current Ib from the current sensor 51b. The power storage ratio SOC is a ratio of a capacity of dischargeable power of the battery 50 to a full capacity of the battery 50.

Although not illustrated in the drawing, the HVECU 70 is constituted by a microprocessor centered on a CPU and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80, a shift position SP from a shift position sensor 82 that detects an operating position of a shift lever 81, an accelerator operation amount Acc from an accelerator pedal position sensor 84 that detects an accelerator depression amount of an accelerator pedal 83, and a brake pedal position BP from a brake pedal position sensor 86 that detects a brake depression amount of a brake pedal 85. Examples of the input signals also include a vehicle speed V from a vehicle speed sensor 88, a mode switching control signal from a mode switch 90, a road surface gradient θg from a gradient sensor 91 that detects a gradient of a road surface, and longitudinal acceleration Gx and lateral acceleration Gy from an acceleration sensor 92 that detects acceleration in a longitudinal direction and a lateral direction of the vehicle. As described above, the HVECU 70 is connected to the engine ECU 24, the motor ECU 40, and the battery ECU 52 via the communication port as described above and gives and takes various control signals or data to and from the engine ECU 24, the motor ECU 40, and the battery ECU 52.

Examples of the shift position SP include a parking position (a P position), a reversing position (an R position), a neutral position (an N position), a driving position (a D position), and a manual position (an M position). For the manual position (the M position), an upshift position (a + position) and a downshift position (a − position) are provided. When the shift position SP is changed to the manual position (the M position), driving of the engine 22 is controlled such that the engine is connected to the drive shaft 36 via an automatic gearshift of six virtual shift stages. The mode switch 90 is a switch which is used to select driving modes including a driving feeling priority mode in which fuel efficiency is slightly decreased but a driver's driving feeling (drivability or driving feeling) has priority and a normal driving mode in which fuel efficiency has priority. When the normal driving mode is selected and the shift position SP is the driving position (the D position), driving of the engine 22 and the motors MG1 and MG2 are controlled such that static inertia and fuel efficiency are compatible with each other. When the driving feeling priority mode is selected and the shift position SP is the driving position (the D position), driving of the engine 22 is controlled such that the engine is connected to the drive shaft 36 via the automatic gearshift of six virtual shift stages.

The hybrid vehicle 20 according to the first embodiment having the above-mentioned configuration travels in any one of a plurality of driving modes including a hybrid driving (HV driving) mode and an electrical driving (EV driving) mode. Here, the HV driving mode is a mode in which the vehicle travels using a power from the engine 22 and a power from the motors MG1 and MG2 while the engine 22 operates. The EV driving mode is a mode in which the vehicle travels using a power from the motor MG2 without operating the engine 22.

Figure 2:
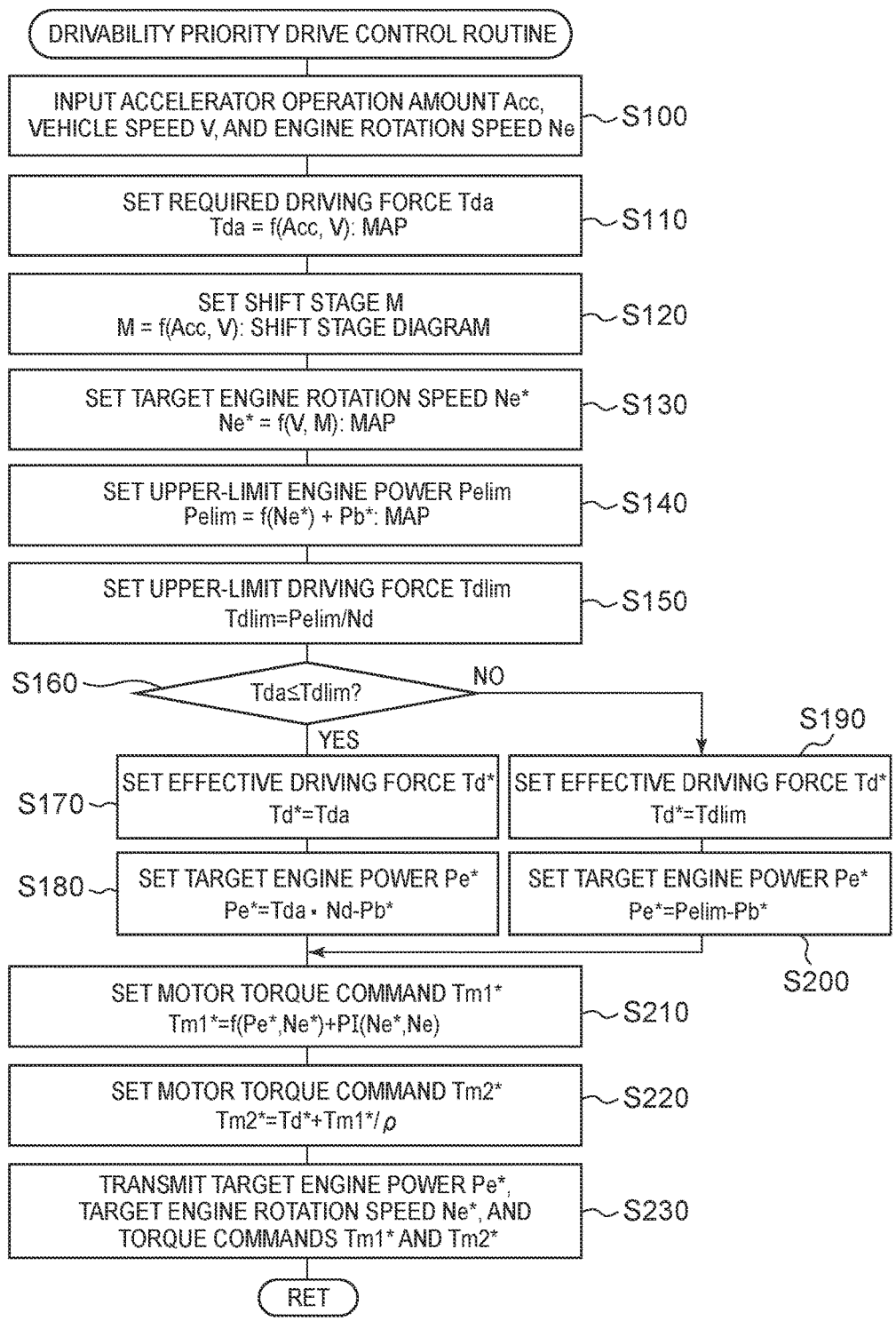
FIG. 2 is a flowchart illustrating an example of a drivability priority drive control routine which is performed by an HVECU 70 when an accelerator is turned on in a driving feeling priority mode and at a D position.

The operation of the hybrid vehicle 20 having the above-mentioned configuration, particularly, the operation when an accelerator is turned on in a state in which the driving feeling priority mode is selected by the mode switch 90, will be described below. FIG. 2 is a flowchart illustrating an example of a drivability priority drive control routine which is performed by the HVECU 70 when the driving feeling priority mode is selected and the accelerator is turned on with the shift position SP set to the driving position (the D position). This routine is repeatedly performed at predetermined times (for example, every several msec). Before describing drive control when the accelerator is turned on at the D position in the driving feeling priority mode using the drivability priority drive control routine illustrated in FIG. 2, drive control when the accelerator is turned on at the D position in the normal driving mode (drive control in the HV driving mode) will be first described for the purpose of convenience of explanation.

In the normal driving mode, when the accelerator is turned on in the HV driving mode, drive control is performed as follows by the HVECU 70. The HVECU 70 first calculates a required driving force Tda which is required for traveling (required for the drive shaft 36) based on the accelerator operation amount Acc and the vehicle speed V and sets the required driving force Tda as an effective driving force Td*. The required driving force Tda can be calculated, for example, from a required driving force setting map illustrated in FIG. 3. Subsequently, the set effective driving force Td* is multiplied by a rotation speed Nd of the drive shaft 36 to calculate a driving required power Pedry required for traveling. Here, a rotation speed obtained by multiplying the rotation speed Nm2 of the motor MG2 by a conversion factor km, a rotation speed obtained by multiplying the vehicle speed V by a conversion factor kv, or the like can be used as the rotation speed Nd of the drive shaft 36. A charging/discharging required power Pb* (which has a positive value when a power is discharged from the battery 50) of the battery 50 is set such that the power storage ratio SOC of the battery 50 approaches a target ratio SOC*, and a target engine power Pe* is calculated by subtracting the charging/discharging required power Pb* of the battery 50 from the driving required power Pedry as expressed by Expression (I). The charging/discharging required power Pb* is set, for example, using a charging/discharging required power setting map illustrated in FIG. 4. In the charging/discharging required power setting map, a dead zone from a value S1 to a value S2 with respect to the target ratio SOC* is provided and the charging/discharging required power Pb* is set as a discharging power (a power with a positive value) when the power storage ratio SOC is greater than the upper limit value S2 of the dead zone, and is set as a charging power (a power with a negative value) when the power storage ratio SOC is less than the lower limit value S1 of the dead zone.

$$Pe^* = \text{Pedry} - Pb^* \quad (1)$$

Figure 5:
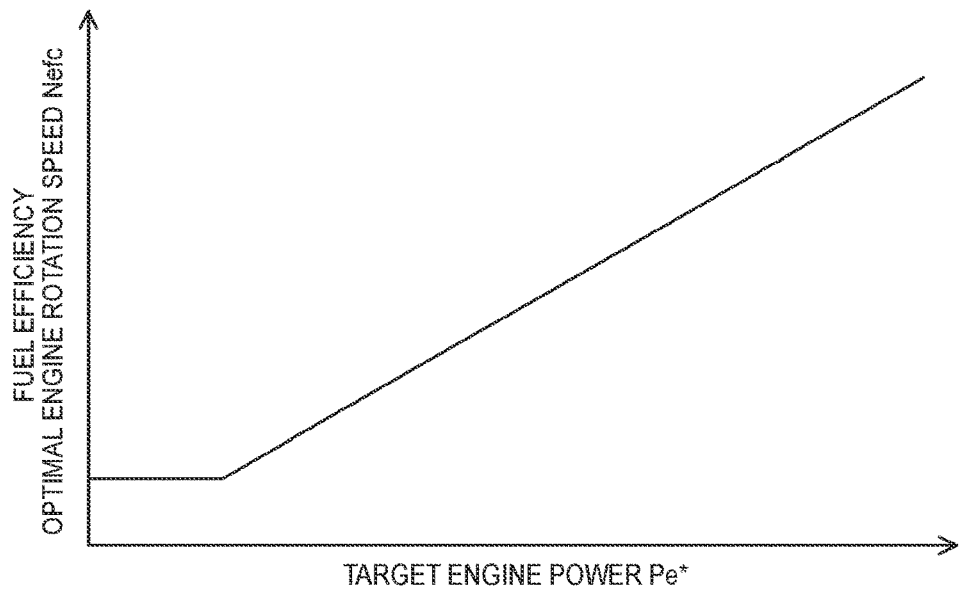
FIG. 5 is a diagram illustrating an example of a fuel efficiency optimal engine rotation speed setting map.

Then, a fuel efficiency optimal engine rotation speed Nefc is calculated using the target engine power Pe* and a fuel efficiency optimal engine rotation speed setting map, and the fuel efficiency optimal engine rotation speed Nefc is set as the target engine rotation speed Ne*. An example of the fuel efficiency optimal engine rotation speed setting map is illustrated in FIG. 5. The fuel efficiency optimal engine rotation speed setting map shows rotation speeds at which the engine 22 can efficiently operate with respect to the target engine power Pe* determined by experiment or the like. Since the fuel efficiency optimal engine rotation speed Nefc basically increases as the target engine power Pe* increases, the target engine rotation speed Ne* also increases as the target engine power Pe* increases. Subsequently, as expressed by Expression (2), a torque command Tm1* of the motor MG1 is calculated using the rotation speed Ne of the engine 22, the target engine rotation speed Ne*, the target engine power Pe*, and a gear ratio ρ of the planetary gear 30 (the number of teeth of the sun gear/the number of teeth of the ring gear). Expression (2) is a relational expression of rotation speed feedback control for causing the engine 22 to rotate at the target engine rotation speed Ne*. In Expression (2), the first term on the right side is a feedforward term, and the second and third terms on the right side are a proportional term and an integral term of a feedback term. The first term on the right side denotes a torque which is used for the motor MG1 to receive a torque output from the engine 22 and applied to the rotary shaft of the motor MG1 via the planetary gear 30. "kp" of the second term on the right side denotes a gain of the proportional term, and "ki" of the third term on the right side denotes a gain of the integral term. Considering a case in which the engine 22 is in a substantially static state (when the target engine rotation speed Ne* and the target engine power Pe* are substantially constant), it can be seen that as the target engine power Pe* increases, the first term on the right side of Expression (2) decreases (the absolute value thereof increases), the torque command Tm1* of the motor MG1 decreases (increases to the negative side), and electric power of the motor MG1 (which has a positive value when the electric power is consumed) obtained by multiplying the torque command Tm1* of the motor MG1 by the rotation speed Nm1 decreases (generated power increases).

$$Tm1^* = -(Pe^*/Ne^*) \cdot [\rho/(1+\rho)] + kp \cdot (Ne^* - Ne) + ki \cdot \int(Ne^* - Ne)dt \quad (2)$$

Then, as expressed by Expression (3), a torque command Tm2* of the motor MG2 is set by subtracting a torque (−Tm1*/ρ) output from the motor MG1 and applied to the drive shaft 36 via the planetary gear 30 when the motor MG1 is driven in accordance with the torque command Tm1* from the effective driving force Td*.

$$Tm2^* = Td^* + Tm1^*/\rho \quad (3)$$

When the target engine power Pe*, the target engine rotation speed Ne*, and the torque commands Tm1* and Tm2* of the motors MG1 and MG2 are set in this way, the target engine power Pe* and the target engine rotation speed Ne* are transmitted to the engine ECU 24 and the torque commands Tm1* and Tm2* of the motors MG1 and MG2 are transmitted to the motor ECU 40.

When the target engine power Pe* and the target engine rotation speed Ne* are received, the engine ECU 24 performs intake air volume control, fuel injection control, ignition control, and the like of the engine 22 such that the engine 22 operates based on received target engine power Pe* and the received target engine rotation speed Ne*. When the torque commands Tm1* and Tm2* of the motors MG1 and MG2 are received, the motor ECU 40 performs switching control of a plurality of switching elements of the inverters 41 and 42 such that the motors MG1 and MG2 are driven with the torque commands Tm1* and Tm2*.

In the EV driving mode, the HVECU 70 sets the effective driving force Td* in the same way as in the HV driving mode, sets the torque command Tm1* of the motor MG1 to a value 0, and sets the torque command Tm2* of the motor MG2 in the same way as in the HV driving mode. The torque commands Tm1* and Tm2* of the motors MG1 and MG2 are transmitted to the motor ECU 40. Then, the motor ECU 40 performs the switching control of the plurality of switching elements of the inverters 41 and 42 as described above.

Drive control when the accelerator is turned on at the D position in the driving feeling priority mode will be described below with reference to the drivability priority drive control routine illustrated in FIG. 2. When the drivability priority drive control routine illustrated in FIG. 2 is performed, the HVECU 70 receives signals of the accelerator operation amount Acc from the accelerator pedal position sensor 84, the vehicle speed V from the vehicle speed sensor 88, and the rotation speed Ne of the engine 22 (Step S100). The HVECU 70 determines whether or not the accelerator is turned on based on the received signal of the accelerator operation amount Acc. Here, as the rotation speed Ne of the engine 22, a value calculated based on the crank angle θcr from the crank position sensor 23 can be received from the engine ECU 24 by communication.

Figure 6:
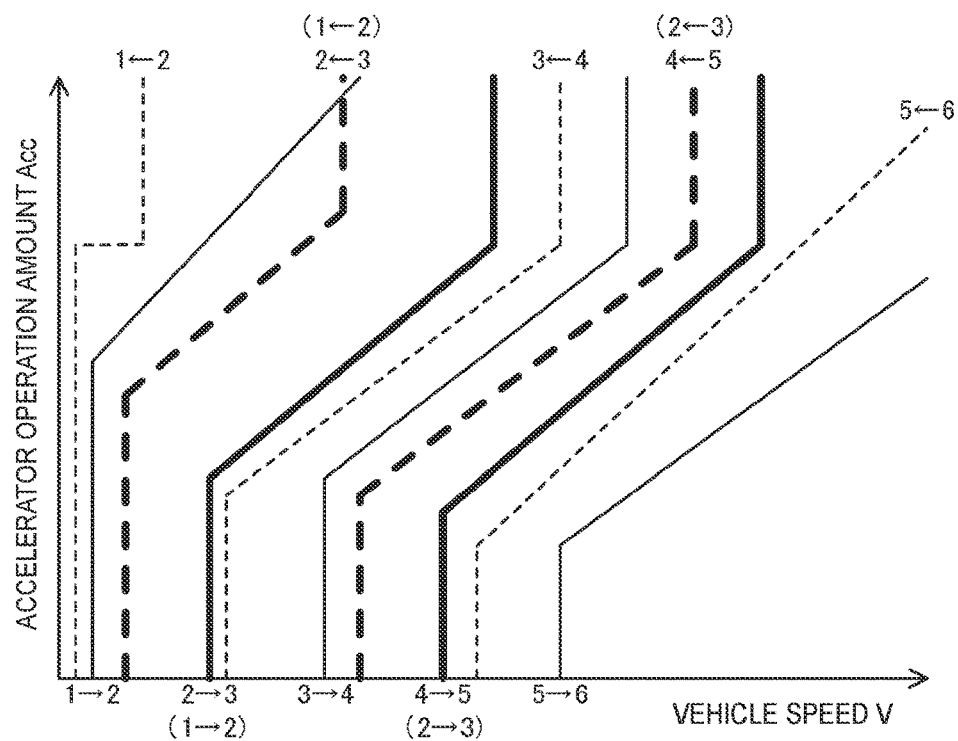
FIG. 6 is a diagram illustrating an example of a shift stage diagram.

Subsequently, the required driving force Tda is set using the accelerator operation amount Acc, the vehicle speed V, and the required driving force setting map illustrated in FIG. 3 (Step S110) and the shift stage M is set using the accelerator operation amount Acc, the vehicle speed V, and a shift stage diagram (Step S120). FIG. 6 illustrates an example of the shift stage diagram. In the drawing, solid lines denote upshift lines, and dotted lines denote downshift lines. In the first embodiment, since control is performed with the automatic gearshift of six virtual shift stages, the shift stage diagram also corresponds to six shift stages.

Figure 7:
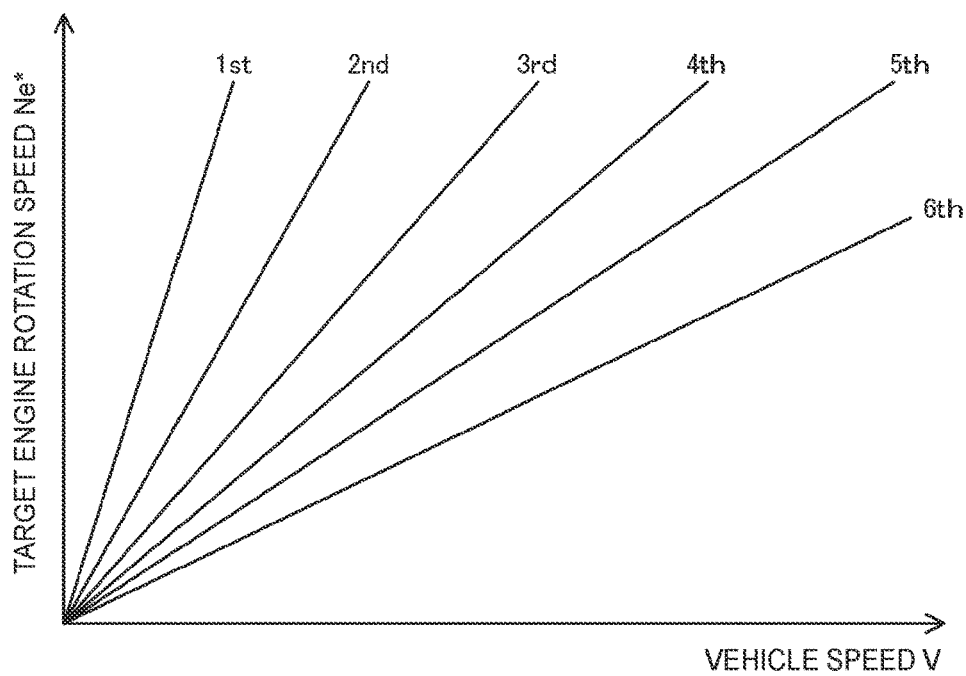
FIG. 7 is a diagram illustrating an example of a target engine rotation speed setting map.

When the shift stage M is set, a target engine rotation speed Ne* is set using the vehicle speed V, the shift stage M, and a target engine rotation speed setting map (Step S130). FIG. 7 illustrates an example of the target engine rotation speed setting map. As illustrated in the drawing, the target engine rotation speed Ne* is set in a linear relationship with the vehicle speed V for each shift stage such that a slope with respect to the vehicle speed V decreases as the shift stage increases. The reason for setting the target engine rotation speed Ne* in this way is to give a driving feeling of a vehicle equipped with an automatic gearshift to a driver by increasing the rotation speed Ne of the engine 22 with an increase in the vehicle speed V for each shift stage, or decreasing the rotation speed Ne of the engine 22 in upshifting and increasing the rotation speed Ne of the engine 22 in downshifting.

Figure 8:
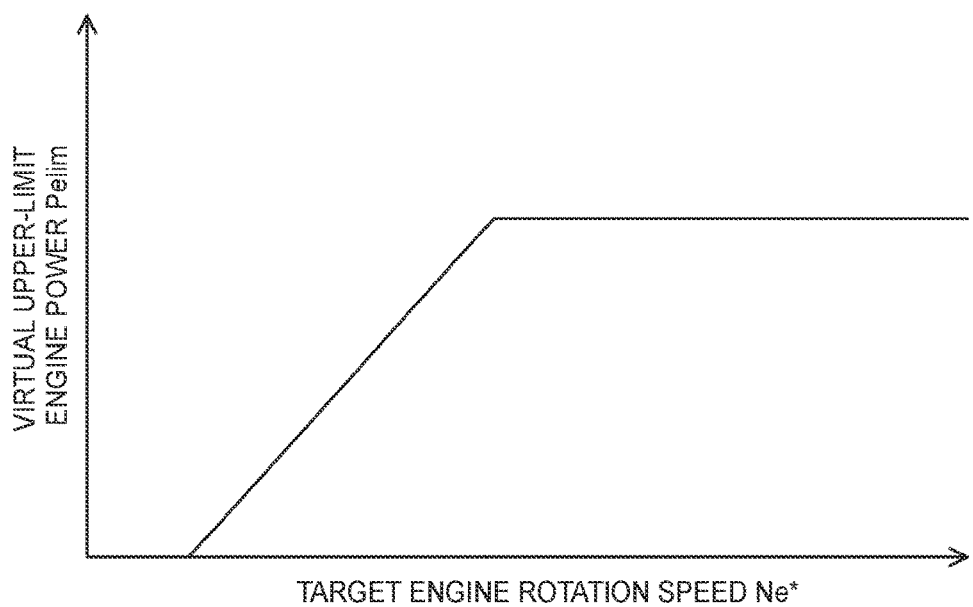
FIG. 8 is a diagram illustrating an example of an upper-limit engine power setting map.

Then, the upper-limit engine power Pelim is set by adding a charging/discharging required power Pb* to a temporary upper-limit engine power Pelim which is obtained using the target engine rotation speed Ne* and an upper-limit engine power setting map (Step S140). Here, the upper-limit engine power Pelim is a maximum power output from the engine 22 when the engine 22 operates at the target engine rotation speed Ne*. FIG. 8 illustrates an example of the upper-limit engine power setting map. As illustrated in the drawing, the temporary upper-limit engine power Pelim is set to increase as the target engine rotation speed Ne* increases. The reason for addition of the charging/discharging required power Pb* to the temporary upper-limit engine power Pelim is that the power output from the engine 22 does not change even when the battery 50 is charged or discharged. This will be described later. When the power storage ratio SOC is in a dead zone (a range from a value S1 to a value S2 in FIG. 4) centered on a target ratio SOC*, the charging/discharging required power Pb* is set to 0 and thus the temporary upper-limit engine power Pelim obtained from the upper-limit engine power setting map illustrated in FIG. 8 is set as the upper-limit engine power Pelim. When the upper-limit engine power Pelim is set in this way, an upper-limit driving force Tdlim is set by dividing the upper-limit engine power Pelim by the rotation speed Nd of the drive shaft 36 (Step S150). Here, the upper-limit driving force Tdlim is a driving force when the upper-limit engine power Pelim is output to the drive shaft 36. As the rotation speed Nd of the drive shaft 36, a rotation speed obtained by multiplying the rotation speed Nm2 of the motor MG2 by the conversion factor km or a rotation speed obtained by multiplying the vehicle speed V by the conversion factor kv can be used as described above.

The required driving force Tda and the upper-limit driving force Tdlim are compared (Step S160). When the required driving force Tda is equal to or less than the upper-limit driving force Tdlim, the required driving force Tda is set as the effective driving force Td* (Step S170) and a value obtained by subtracting the charging/discharging required power Pb* from a value which is obtained by multiplying the required driving force Tda by the rotation speed Nd of the drive shaft 36 is set as the target engine power Pe* (Step S180), similarly to the normal driving mode. Accordingly, the target engine power Pe* can be said to be a power for outputting the required driving force Tda to the drive shaft 36.

On the other hand, when it is determined in Step S160 that the required driving force Tda is greater than the upper-limit driving force Tdlim, the upper-limit driving force Tdlim is set as the effective driving force Td* (Step S190) and a value obtained by subtracting the charging/discharging required power Pb* from the upper-limit engine power Pelim is set as the target engine power Pe* (Step S200). Since the upper-limit engine power Pelim is set by adding the charging/discharging required power Pb* to the temporary upper-limit engine power Pelim obtained from the upper-limit engine power setting map illustrated in FIG. 8 in Step S140, setting a value obtained by subtracting the charging/discharging required power Pb* from the upper-limit engine power Pelim as the target engine power Pe* refers to setting the temporary upper-limit engine power Pelim obtained from the upper-limit engine power setting map illustrated in FIG. 8 as the target engine power Pe*. In this way, by considering the charging/discharging required power Pb*, the operating point of the engine 22 can be maintained constant regardless of charging/discharging of the battery 50. Since the upper-limit driving force Tdlim is calculated by dividing the upper-limit engine power Pelim by the rotation speed Nd of the drive shaft 36 in Step S160, the upper-limit engine power Pelim can be said to be a power for outputting the upper-limit driving force Tdlim to the drive shaft 36.

Then, the torque command Tm1* of the motor MG1 is set using Expression (2) (Step S210) and the torque command Tm2* of the motor MG2 is set using Expression (3) (Step S220). The target engine power Pe* and the target engine rotation speed Ne* are transmitted to the engine ECU 24, the torque commands Tm1* and Tm2* are transmitted to the motor ECU 40 (Step S230), and the routine ends.

Figure 9:
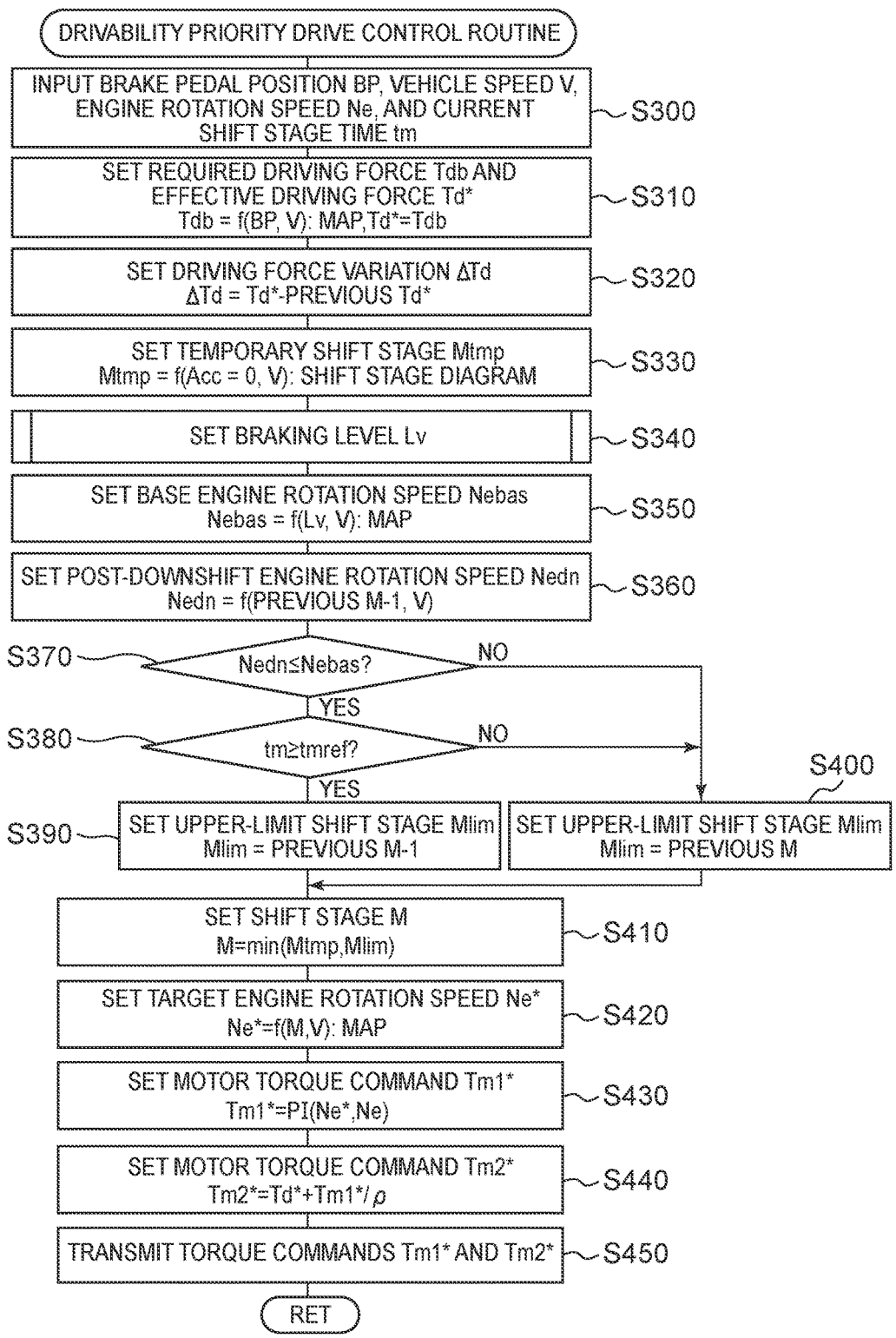
FIG. 9 is a flowchart illustrating an example of a drivability priority drive control routine which is performed by the HVECU 70 when a brake is turned on during travel in the driving feeling priority mode and at the D position.

An operation when the brake is turned on during travel in a state in which a driving feeling priority mode is selected by the mode switch 90 will be described below. FIG. 9 is a flowchart illustrating an example of a drivability priority drive control routine which is performed by the HVECU 70 when the brake is turned on during travel in a state in which the driving feeling priority mode is selected and the shift position SP is the D position. This routine is repeatedly performed at predetermined times (for example, every several msec). Before describing drive control when the brake is turned on during travel at the D position in the driving feeling priority mode using the drivability priority drive control routine illustrated in FIG. 9, drive control when the brake is turned on during travel at the D position in the normal driving mode (drive control in the HV driving mode) will be first described for the purpose of convenience of explanation.

Figure 10:
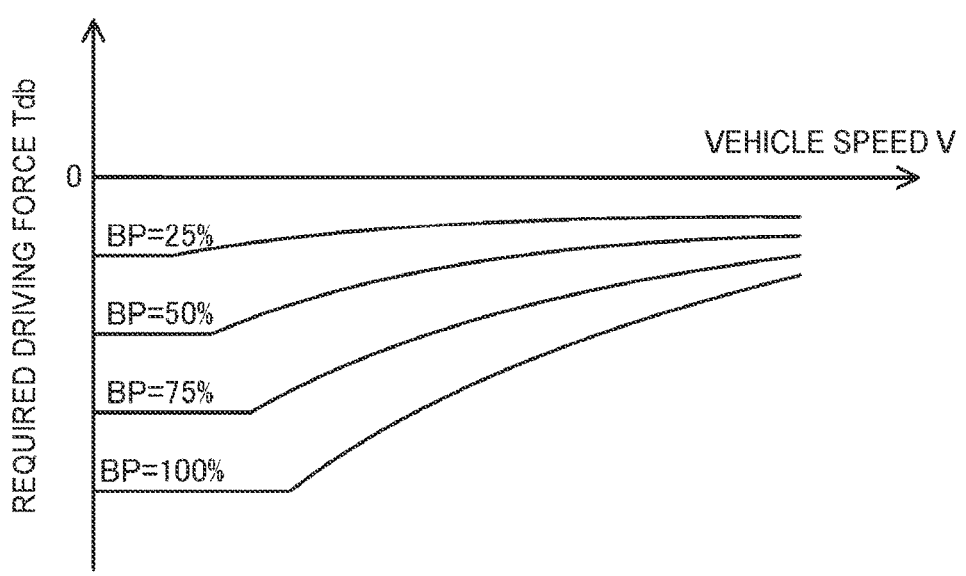
FIG. 10 is a diagram illustrating an example of a required driving force setting map.

In the normal driving mode, when the brake is turned on during travel in the HV driving mode, the drive control is performed as follows by the HVECU 70. The HVECU 70 first calculates a required driving force Tdb which is required for traveling (required for the drive shaft 36) based on a brake pedal position BP and the vehicle speed V and sets the required driving force Tdb as an effective driving force Td*. The required driving force Tdb can be calculated, for example, from a required driving force setting map illustrated in FIG. 10. As illustrated in FIG. 10, when the brake is turned on, the effective driving force Td* in addition to the required driving force Tdb has a negative value and thus a value obtained by inverting the sign of the effective driving force Td* can be considered to be an effective braking force Tb*. Subsequently, a predetermined rotation speed Nfc (for example, 1000 rpm) is set as the target engine rotation speed Ne* of the engine 22. Then, as expressed by Expression (4), the torque command Tm1* of the motor MG1 is calculated using the rotation speed Ne and the target engine rotation speed Ne* of the engine 22. Expression (4) is a relational expression of rotation speed feedback control for causing the engine 22 to rotate at the target engine rotation speed Ne* and corresponds to an expression obtained by removing the first term on the right side of Expression (2).

$$Tm1^* = kp \cdot (Ne^* - Ne) + ki \cdot \int (Ne^* - Ne) dt \quad (4)$$

Then, the torque command Tm2* of the motor MG2 is set by Expression (3). The torque commands Tm1* and Tm2* of the motors MG1 and MG2 are transmitted to the motor ECU 40. When the torque commands Tm1* and Tm2* of the motors MG1 and MG2 are received, the motor ECU 40 controls switching of the plurality of switching elements of the inverters 41 and 42 such that the motors MG1 and MG2 are driven in accordance with the torque commands Tm1* and Tm2*.

The drive control when the brake is turned on during travel at the D position in the driving feeling priority mode will be described below using the drivability priority drive control routine illustrated in FIG. 9. When the drivability priority drive control routine illustrated in FIG. 9 is performed, the HVECU 70 first receives signals of the brake pedal position BP from the brake pedal position sensor 86, the vehicle speed V from the vehicle speed sensor 88, the rotation speed Ne of the engine 22, and a current shift stage time tm as duration of a current shift stage (Step S300). The HVECU 70 determines whether or not the brake is turned on based on the received signal of the brake pedal position BP.

Subsequently, the required driving force Tdb is set using the brake pedal position BP, the vehicle speed V, and the required driving force setting map illustrated in FIG. 10 and the set required driving force Tdb is set as an effective driving force Td* (Step S310), and a value obtained by subtracting the effective driving force set when this routine is previously performed (the previous Td*) from the set effective driving force Td* is set as a driving force variation ΔTd (Step S320). When the brake is turned on, the effective driving force Td* in addition to the required driving force Tdb has a negative value and a value obtained by inverting the sign of the effective driving force Td* can be considered to be the effective braking force Tb* as described above. Accordingly, when a driving force variation ΔTdb has a negative value, it means that the effective driving force Td* decreases (the effective braking force Tb* increases).

A temporary shift stage Mtmp is set as a virtual value of the shift stage M using the accelerator operation amount Acc with a value 0, the vehicle speed V, and the shift stage diagram (Step S330). In this case, a diagram in which the "shift stage M" in the shift stage diagram illustrated in FIG. 6 is replaced with a "temporary shift stage Mtmp" can be used as the shift stage diagram.

Subsequently, a braking level Lv is set by a braking level setting process illustrated in FIG. 11 (Step S340). Here, the braking level Lv is a level indicating what braking force is required by a driver, and three levels of levels Lv1, Lv2, and Lv3 from the lowermost level are used in this embodiment. When turning-on of the brake starts, level Lv1 is set as the braking level lv. Hereinafter, description of the drivability priority drive control routine illustrated in FIG. 9 will stop and the braking level setting process illustrated in FIG. 11 will be described.

Figure 11:
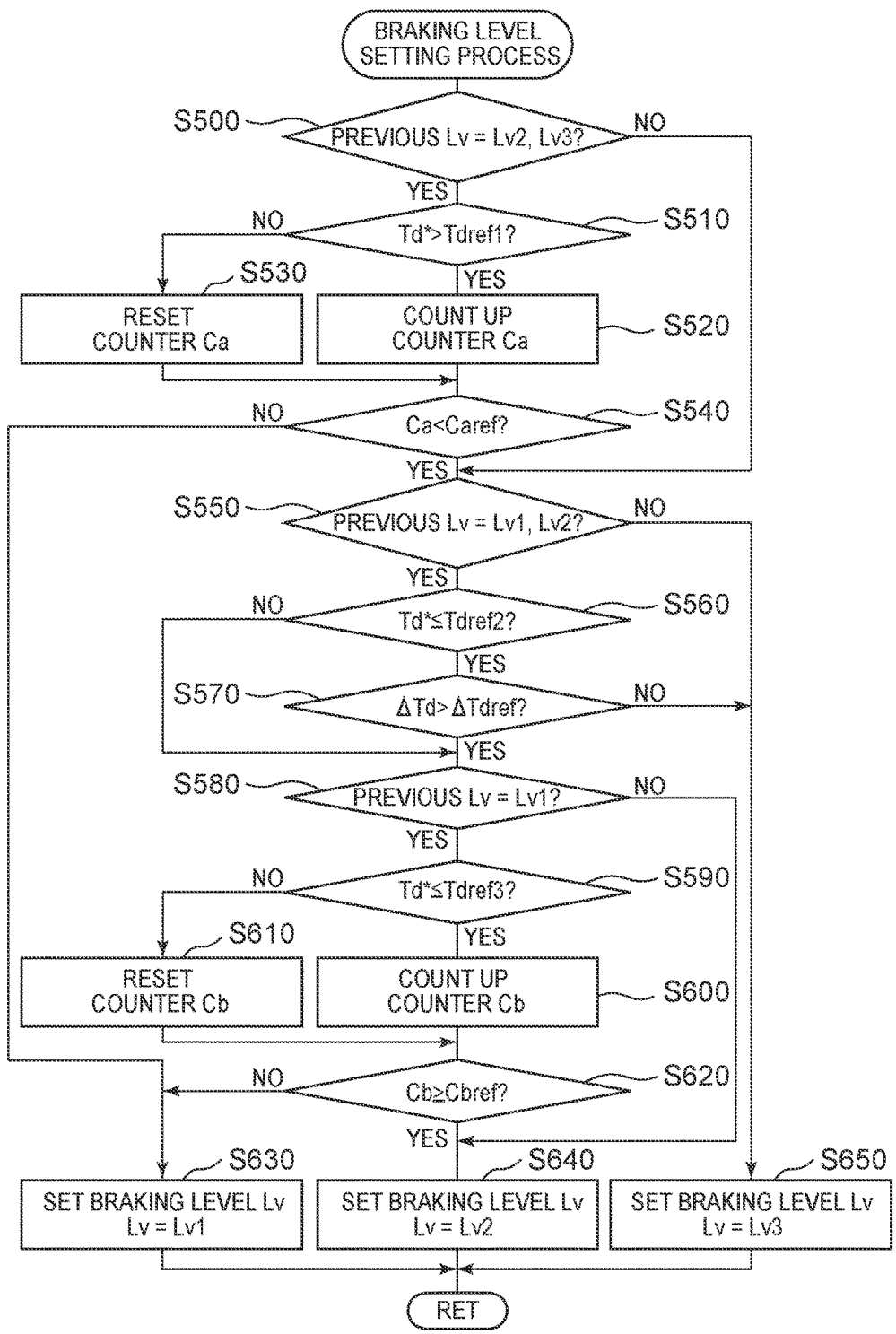
FIG. 11 is a flowchart illustrating an example of a braking level setting process.

In the braking level setting process illustrated in FIG. 11, the HVECU 70 first checks the braking level which is set when this routine is previously performed (previous Lv) (Step S500), and compares the effective driving force Td* with a threshold value Tdref1 when the braking level which is set when this routine is previously performed (the previous Lv) is level Lv2 or Lv3 (Step S510). Here, the threshold value Tdref1 is a threshold value which is used to determine whether the effective driving force Td* is relatively large (whether the effective braking force Tb* is relatively small), and for example,—–90 Nm, –100 Nm, or –110 Nm can be used. A counter Ca is counted up when the effective driving force Td* is greater than the threshold value Tdref1 (step S520), and the counter Ca is reset to a value 0 when the effective driving force Td* is equal to or less than the threshold value Tdref1 (Step S530).

Subsequently, the counter Ca is compared with a threshold value Caref (Step S540). Here, the threshold value Caref is a threshold value which is used to determine how long the state in which the effective driving force Td* is greater than the threshold value Tdref1 (the state in which the effective braking force Tb* is relatively small) is maintained, and for example, a value corresponding to 4 sec, 5 sec, or 6 sec can be used. When the counter Ca is equal to or greater than the threshold value Caref, the braking level Lv is set to level Lv1 (Step S630) and then this routine ends. Accordingly, it is possible to prevent the braking level Lv from being changed due to instantaneous fluctuation of the effective driving force Td*. For example, when the brake pedal 85 is stepped on when a vehicle enters a corner and then corners are continuous at relatively short intervals, it is possible to prevent the braking level Lv from being frequently switched (being returned from level Lv2 or level Lv3 to level Lv1).

When it is determined in Step S540 that the level counter Ca is less than the threshold value Caref or when it is determined in Step S500 that the braking level which is set when this routine is previously performed (the previous Lv) is level Lv1, the braking level which is set when this routine is previously performed (the previous Lv) is checked (Step S550). Then, when the braking level which is set when this routine is previously performed (the previous Lv) is level Lv3, the braking level Lv is set to level Lv3 (Step S650) and then this routine ends.

When it is determined in Step S550 that the braking level which is set when this routine is previously performed (the previous Lv) is level Lv1 or level Lv2, the effective driving force Td* is compared with a threshold value Tdref2 equal to or less than the threshold value Tdref1 (Step S560) and the driving force variation ΔTd is compared with a threshold value ΔTdref (Step S570). Here, the threshold value Tdref2 is a threshold value which is used to determine whether the effective driving force Td* is relatively small (whether the effective braking force Tb* is relatively large), and for example, –240 Nm, –250 Nm, or –260 Nm can be used. The threshold value ΔTdref is a threshold value which is used to determine whether the driving force variation ΔTd is relatively small (whether an increase in the effective braking force Tb* is relatively large), and for example, –240 Nm, –250 Nm, or –260 Nm can be used for each interval at which the drivability priority drive control routine illustrated in FIG. 9 is performed.

When it is determined in Step S560 that the effective driving force Td* is equal to or less than the threshold value Tdref2 and it is determined in Step S570 that the driving force variation ΔTd is equal to or less than the threshold value ΔTdref, the braking level Lv is set to level Lv3 (Step S650) and then this routine ends.

When it is determined in Step S560 that the effective driving force Td* is larger than the threshold value Tdref2 or it is determined in Step S570 that the driving force variation ΔTd is larger than the threshold value ΔTdref, the braking level which is set when this routine is previously performed (the previous Lv) is checked (Step S580). Then, when the braking level which is set when this routine is previously performed (the previous Lv) is level Lv2, the braking level lv is set to level Lv2 (Step S640) and then this routine ends.

When it is determined in Step S580 that the braking level which is set when this routine is previously performed (the previous Lv) is level Lv1, the effective driving force Td* is compared with a threshold value Tdref3 equal to or less than the threshold value Tdref1 (Step S590). Here, the threshold value Tdref3 is a threshold value which is used to determine whether the effective driving force Td* is relatively small (whether the effective braking force Tb* is relatively large), similarly to the threshold value Tdref2, and for example, a value from about −250 Nm to −500 Nm can be used. When the effective driving force Td* is equal to or less than the threshold value Tdref3, a counter Cb is counted up (Step S600). When the effective driving force Td* is larger than the threshold value Tdref3, the counter Cb is reset to a value 0 (Step S610).

Subsequently, the counter Cb is compared with a threshold value Cbref (Step S620). Here, the threshold value Cbref is a threshold value which is used to determine how long the state in which the effective driving force Td* is equal to or less than the threshold value Tdref3 (the state in which the effective braking force Tb* is relatively large) is maintained, for example, a value corresponding to several tens of msec to several hundreds of msec can be used. When the counter Cb is less than the threshold value Cbref, the braking level Lv is set to level Lv1 (Step S630) and then this routine ends. On the other hand, when the counter Cb is equal to or greater than the threshold value Cbref, the braking level Lv is set to level Lv2 (Step S640) and then this routine ends. Accordingly, it is possible to prevent the braking level Lv from being switched due to instantaneous fluctuation of the effective driving force Td*.

Figure 12:
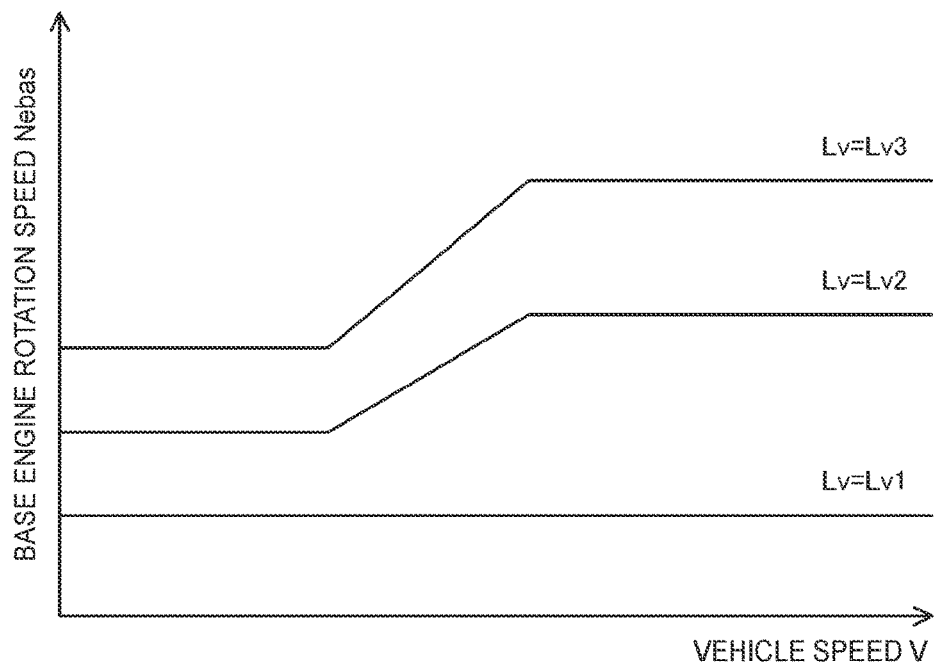
FIG. 12 is a diagram illustrating an example of a base engine rotation speed setting map.

The braking level setting process illustrated in FIG. 11 has been described above. The drivability priority drive control routine illustrated in FIG. 9 will be described again. When the braking level Lv is set in Step S340, a base engine rotation speed Nebas is set using the braking level Lv, the vehicle speed V, and a base engine rotation speed setting map (Step S350). An example of the base engine rotation speed setting map is illustrated in FIG. 12. As illustrated in the drawing, the base engine rotation speed Nebas is set to increase as the braking level Lv increases. Setting of the base engine rotation speed Nebas in this way gives a better driving feeling to a driver by setting the rotation speed Ne of the engine 22 to a rotation speed corresponding to the braking level Lv. When the braking level Lv is level Lv2 or level Lv3 and the vehicle speed V is low, the base engine rotation speed Nebas is set to be lower than when the vehicle speed V is high. Setting of the base engine rotation speed Nebas in this way prevents an increase in the rotation speed Ne of the engine 22 and prevents the braking force acting on the drive shaft 36 from increasing excessively due to motoring of the engine 22 by the motor MG1 when the vehicle speed V is relatively low. As described above, it is possible to prevent the braking level Lv from being switched due to instantaneous fluctuation of the effective driving force Td* using the counter Ca or the counter Cb and thus to prevent the base engine rotation speed Nebas from being frequently switched.

Subsequently, a post-downshift engine rotation speed Nedn is set using a shift stage (a previous M−1) one step lower than a shift stage which is set when this routine is previously performed (a previous M), the vehicle speed V, and a post-downshift engine rotation speed setting map (Step S360). As the post-downshift engine rotation speed setting map, a map obtained by replacing the "target engine rotation speed Ne*" of the vertical axis in the target engine rotation speed setting map illustrated in FIG. 7 with a "post-downshift engine rotation speed Nedn" can be used.

Then, the post-downshift engine rotation speed Nedn is compared with the base engine rotation speed Nebas (Step S370). When the post-downshift engine rotation speed Nedn is higher than the base engine rotation speed Nebas, the shift stage set when this routine is previously performed (the previous M) is set as an upper-limit shift stage Mlim (Step S400) and the smaller of the temporary shift stage Mtmp and the upper-limit shift stage Mlim is set as the shift stage M (Step S410). Now, a case in which the brake is turned on (basically, a case in which deceleration is performed) is considered. Accordingly, the shift stage M is maintained when the temporary shift stage Mtmp is not changed, and the shift stage M is downshifted by one step when the temporary shift stage Mtmp is downshifted by one step. When the shift stage M is downshifted by one step, the post-downshift engine rotation speed Nedn set in Step S360 and the target engine rotation speed Ne* set in Step S420 are equal to each other.

Subsequently, the target engine rotation speed Ne* is set using the shift stage M, the vehicle speed V, and the target engine rotation speed setting map illustrated in FIG. 7 (Step S420), the torque command Tm1* of the motor MG1 is set using Expression (4) (Step S430), and the torque command Tm2* of the motor MG2 is set using Expression (3) (Step S440). Then, the torque commands Tm1* and Tm2* of the motors MG1 and MG2 are transmitted to the motor ECU 40 (Step S450) and then this routine ends. By this control, the effective driving force Td* (the effective braking force Tb*) can be applied to the drive shaft 36 while causing the engine 22 to rotate at the target engine rotation speed Ne* using the motor MG1. At this time, the rotation speed Ne of the engine 22 can be set to the rotation speed corresponding to (matching) the shift stage M and the vehicle speed V. When the shift stage M is changed, it is possible to give a feeling of change in speed to a driver. As a result, it is possible to give a better driving feeling to a driver.

When it is determined in Step S370 that the post-downshift engine rotation speed Nedn is equal to or lower than the base engine rotation speed Nebas, the current shift stage time tm is compared with a threshold value tmref (Step S380). Here, the threshold value tmref is a threshold value which is used to determine how long the shift stage M is maintained at the current shift stage, and for example, 200 msec, 300 msec, or 500 msec can be used.

When it is determined in Step S380 that the current shift stage time tm is less than the threshold value tmref, the shift stage set when this routine is previously performed (the previous M) is set as the upper-limit shift stage Mlim (Step S400), the shift stage M is set by limiting (guarding to an upper limit) the temporary shift stage Mtmp to the upper-limit shift stage Mlim (Step S410), and the processes of Step S420 and steps subsequent thereto are performed. In this case, as described above, the shift stage M is maintained when the temporary shift stage Mtmp is not changed, and the shift stage M is downshifted by one step when the temporary shift stage Mtmp is downshifted by one step. When the post-downshift engine rotation speed Nedn is equal to or lower than the base engine rotation speed Nebas, the current shift stage time tm is less than the threshold value tmref, and the temporary shift stage Mtmp is not changed, it is possible to prevent the duration of each shift stage from being excessively shortened and thus to prevent riding quality from degrading, by maintaining the shift stage M.

When it is determined in Step S380 that the current shift stage time tm is equal to or greater than the threshold value tmref, a shift stage one step lower than the shift stage set when this routine is previously performed (the previous M) is set as the upper-limit shift stage Mlim (Step S390), the shift stage M is set by limiting (guarding to an upper limit) the temporary shift stage Mtmp to the upper-limit shift stage Mlim (Step S410), and the processes of Step S420 and steps subsequent thereto are performed. In this case, even when the temporary shift stage Mtmp is not changed, the shift stage M is downshifted by one step. When the post-downshift engine rotation speed Nedn is equal to or lower than the base engine rotation speed Nebas and the current shift stage time tm is less than the threshold value tmref, it is possible to set the rotation speed Ne of the engine 22 to a rotation speed within a range equal to or lower than the base engine rotation speed Nebas and to prevent the rotation speed Ne of the engine 22 from being separated from the base engine rotation speed Nebas, by downshifting the shift stage M by one step. Since the shift stage M is downshifted by one step (step by step), it is possible to prevent a degree of increase of the rotation speed Ne of the engine 22 from increasing excessively and to prevent riding quality from degrading.

When the shift stage set when this routine is previously performed (the previous M) is a first stage, the shift stage M cannot be downshifted and thus the shift stage M is set to the first stage (the shift stage M is maintained at the first stage) instead of performing the processes of Steps S360 to S410.

Figure 13:
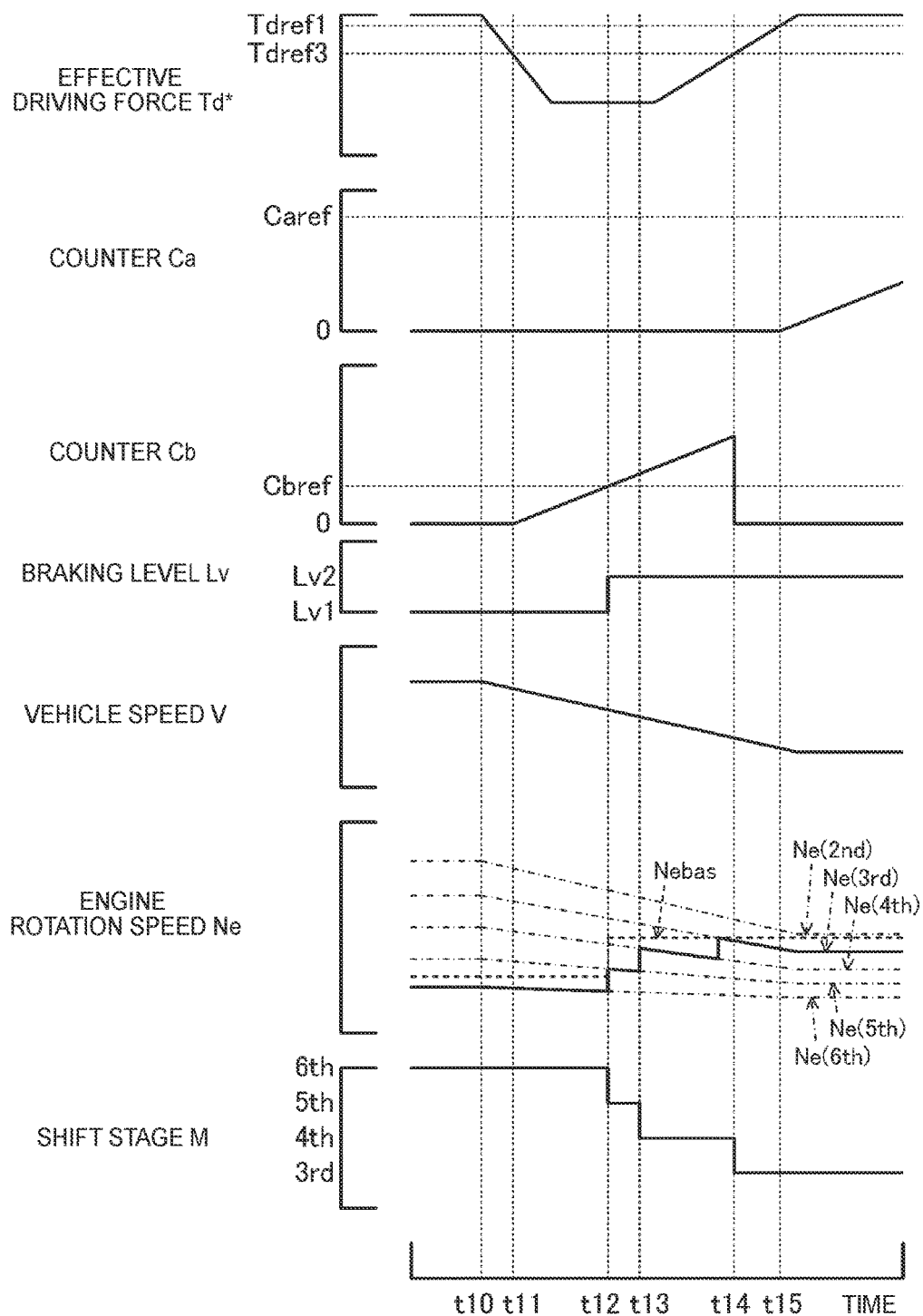
FIG. 13 is a diagram illustrating an example of a state when the brake is turned on during travel in the driving feeling priority mode and at the D position.

FIG. 13 is a diagram illustrating an example of a state in which the brake is turned on during travel at the D position in the driving feeling priority mode. In the drawing, "Ne (2nd)" to "Ne (6-th)" of the rotation speed Ne of the engine 22 indicate the rotation speeds Ne of the engine 22 at the shift stages in the target engine rotation speed setting map illustrated in FIG. 7.

As illustrated in the drawing, when the brake is turned on during travel at a shift stage M of the sixth stage, the effective driving force Td* starts decreasing (time t10), and the effective driving force Td* becomes equal to or less than the threshold value Tdref3 (time t11), the counter Cb starts increasing from a value 0. Then, when the counter Cb becomes equal to or greater than the threshold value Cbref (time t12), the braking level Lv is switched from level Lv1 to level Lv2. By switching the braking level Lv in this way, the base engine rotation speed Nebas increases, and when the post-downshift engine rotation speed Nedn (the rotation speed Ne(5th) of the fifth stage in FIG. 13) becomes equal to or lower than the base engine rotation speed Nebas, the shift stage M is switched from the sixth stage to the fifth stage to increase the rotation speed Ne of the engine 22. Then, when the shift stage M is the fifth stage, the post-downshift engine rotation speed Nedn (the rotation speed Ne(4th) of the fourth stage in FIG. 13) is equal to or lower than the base engine rotation speed Nebas, and the current shift stage time tm becomes equal to or greater than the threshold value tmref (time t13), the shift stage M is switched to the fourth stage to increase the rotation speed Ne of the engine 22. Thereafter, similarly, the shift stage M is switched to the third stage on the condition that the post-downshift engine rotation speed Nedn is equal to or lower than the base engine rotation speed Nebas and the current shift stage time tm is equal to or greater than the threshold value tmref, and thus the rotation speed Ne of the engine 22 increases. By this control, it is possible to set the rotation speed Ne of the engine 22 to the rotation speed corresponding to the vehicle speed V and the shift stage M, and to give a feeling of change in speed to a driver when the shift stage M is changed. As a result, it is possible to give a better driving feeling to a driver. At time t12, the rotation speed Ne(4th) of the fourth stage in addition to the rotation speed Ne(5th) of the fifth stage is less than the base engine rotation speed Nebas, but by switching the shift stage M from the sixth stage to the fifth stage, it is possible to prevent a degree of increase in the rotation speed Ne of the engine 22 from becoming excessively large in comparison with a case in which the shift stage M is switched from the sixth stage to the fourth stage and to prevent riding quality from degrading. Since the threshold value tmref is required until the shift stage M is switched to the fourth stage after the shift stage M is switched from the sixth stage to the fifth stage at time t12, it is possible to prevent the duration of the respective shift stages from being excessively shortening and to prevent riding quality from degrading.

When the effective driving force Td* is equal to or greater than the threshold value Tdref3 (time t14), the counter Cb is reset to a value 0 and then the counter Ca starts increasing from the value 0 when the effective driving force Td* is greater than the threshold value Tdref1 (time t15). The subsequent control will not be repeated.

In the above-mentioned hybrid vehicle 20 according to the first embodiment, when the accelerator is turned on at the D position in the driving feeling priority mode, the target engine rotation speed Ne* is set based on the vehicle speed V and the shift stage M, the upper-limit driving force Tdlim is set based on the target engine rotation speed Ne*, the smaller driving force of the upper-limit driving force Tdlim and the required driving force Tda is set as the effective driving force Td*, and the engine 22 and the motors MG1 and MG2 are controlled such that the effective driving force Td* is output to the drive shaft 36 and the engine 22 rotates at the target engine rotation speed Ne*. Accordingly, even when a driver steps on the accelerator pedal 83, the rotation speed Ne of the engine 22 can be set to a rotation speed (the target engine rotation speed Ne*) corresponding to the vehicle speed V and the shift stage M and it is possible to prevent discomfort from being given as a driving feeling in comparison with a case in which the rotation speed Ne of the engine 22 increases rapidly before the vehicle speed increases. It is possible to give a feeling of change in speed to a driver when the shift stage M is changed (shifted). As a result, it is possible to give a better driving feeling to a driver.

In the hybrid vehicle 20 according to the first embodiment, when the brake is turned on during travel at the D position in the driving feeling priority mode, the effective driving force Td* (the effective braking force Tb*) is set based on the brake pedal position BP, the base engine rotation speed Nebas is set based on the braking level Lv based on the effective driving force Td*, the shift stage M is set based on the base engine rotation speed Nebas and the vehicle speed V, the target engine rotation speed Ne* is set based on the shift stage M and the vehicle speed V, and the engine 22 and the motors MG1 and MG2 are controlled such that the engine 22 rotates at the target engine rotation speed Ne* and the effective driving force Td* is output to the drive shaft 36. Accordingly, when a driver steps on the brake pedal 85, it is possible to set the rotation speed Ne of the engine 22 to a rotation speed corresponding to (matching) the shift stage M and the vehicle speed V. It is possible to give a feeling of change in speed to a driver when the shift stage M is changed. As a result, it is possible to give a better driving feeling to a driver. For example, a case in which the brake pedal 85 is stepped on when the vehicle enters a corner and then the accelerator pedal 83 is stepped on with departure from the corner is considered. At this time, by adjusting the rotation speed Ne of the engine 22 depending on the braking level Lv based on the effective driving force Td* when the brake pedal 85 is stepped on when the vehicle enters the corner, it is thought that the rotation speed Ne of the engine 22 at the time of departure from the corner can be set to be more appropriate and re-acceleration performance when the accelerator pedal 83 is stepped on (when the drivability priority drive control routine illustrated in FIG. 2 is performed) can be improved. By using the braking level Lv, it is possible to set the base engine rotation speed Nebas to be discrete and to give a feeling of switching of the braking level Lv (the base engine rotation speed Nebas) to a driver.

In the hybrid vehicle 20 according to the first embodiment, when the brake is turned on during travel at the D position in the driving feeling priority mode, three levels are used as the braking level Lv. However, as the braking level Lv, two levels may be used or four or more levels may be used.

In the hybrid vehicle 20 according to the first embodiment, when the brake is turned on during travel at the D position in the driving feeling priority mode, the braking level Lv is set as follows. When the braking level Lv is level Lv 1 and the counter Cb which is counted up when the effective driving force Td* is equal to or less than the threshold value Tdref3 becomes equal to or greater than the threshold value Cbref, the braking level Lv is switched to level Lv2. When the braking level Lv is level Lv1 or level Lv2, the effective driving force Td* is equal to or less than the threshold value Tdref2, and the driving force variation ΔTd is equal to or less than the threshold value ΔTdref, the braking level Lv is switched to level Lv3. When the braking level Lv is level Lv2 or level Lv3 and the counter Ca which is counted up when the effective driving force Td* is greater than the threshold value Tdref1 becomes equal to or greater than the threshold value Caref, the braking level Lv is switched to level Lv1. However, as long as the braking level Lv is set based on the effective driving force Td*, the braking level Lv may be set using any method. For example, the braking level Lv may be set as follows. When the braking level Lv is level Lv1 and the effective driving force Td* becomes equal to or less than the threshold value Tdref3, the braking level Lv is switched to level Lv2 (without considering the counter Cb). When the braking level is level Lv2 and the effective driving force Td* is becomes equal to or less than a threshold value Tdref4 smaller than the threshold value Tdref3, the braking level Lv is switched to level Lv3. In addition, when the braking level Lv is level Lv2 and the effective driving force Td* becomes greater than the threshold value Tdref1, the braking level Lv is switched to level Lv1 (without considering the counter Ca). When the braking level Lv is level Lv3 and the effective driving force Td* becomes greater than a threshold value Tdref5 smaller than the threshold value Tdref1 and equal to or greater than the threshold value Tdref4, the braking level Lv is switched to level Lv2.

In the hybrid vehicle 20 according to the first embodiment, when the brake is turned on during travel at the D position in the driving feeling priority mode, the braking level Lv is set based on the effective driving force Td* (the effective braking force Tb*) and the base engine rotation speed Nebas is set based on the braking level Lv. However, the base engine rotation speed Nebas may be set directly based on the effective driving force Td* without setting the braking level Lv based on the effective driving force Td*. In this case, it is considered that the base engine rotation speed Nebas is set to increase as the effective driving force Td* decreases (as the effective braking force Tb* increases).

In the hybrid vehicle 20 according to the first embodiment, when the brake is turned on during travel at the D position in the driving feeling priority mode, the post-downshift engine rotation speed Nedn is equal to or lower than the base engine rotation speed Nebas, and the current shift stage time tm is less than the threshold value tmref, the previous shift stage (the previous M), that is, the current shift stage, is set as the upper-limit shift stage Mlim. However, when the post-downshift engine rotation speed Nedn is equal to or lower than the base engine rotation speed Nebas, the previous shift stage (the previous M), that is, a shift stage one step lower than the current shift stage, may be set as the upper-limit shift stage Mlim without considering the current shift stage time tm.

In the hybrid vehicle 20 according to the first embodiment, when the brake is turned on during travel at the D position in the driving feeling priority mode, the base engine rotation speed Nebas is set using the braking level Lv, the vehicle speed V, and the base engine rotation speed setting map illustrated in FIG. 12. However, the base engine rotation speed Nebas which is obtained using the base engine rotation speed setting map illustrated in FIG. 12 may be corrected depending on a driver's driving taste or may be corrected depending on whether a sport mode switch or a power mode switch is turned on or off in a vehicle including such switches. The sport mode switch is a switch indicating a sport mode in which acceleration or deceleration has priority to that in a normal mode, and the power mode switch is a switch indicating a power mode in which a torque (a power) output has priority to the sport mode or the normal mode.

Figure 14:
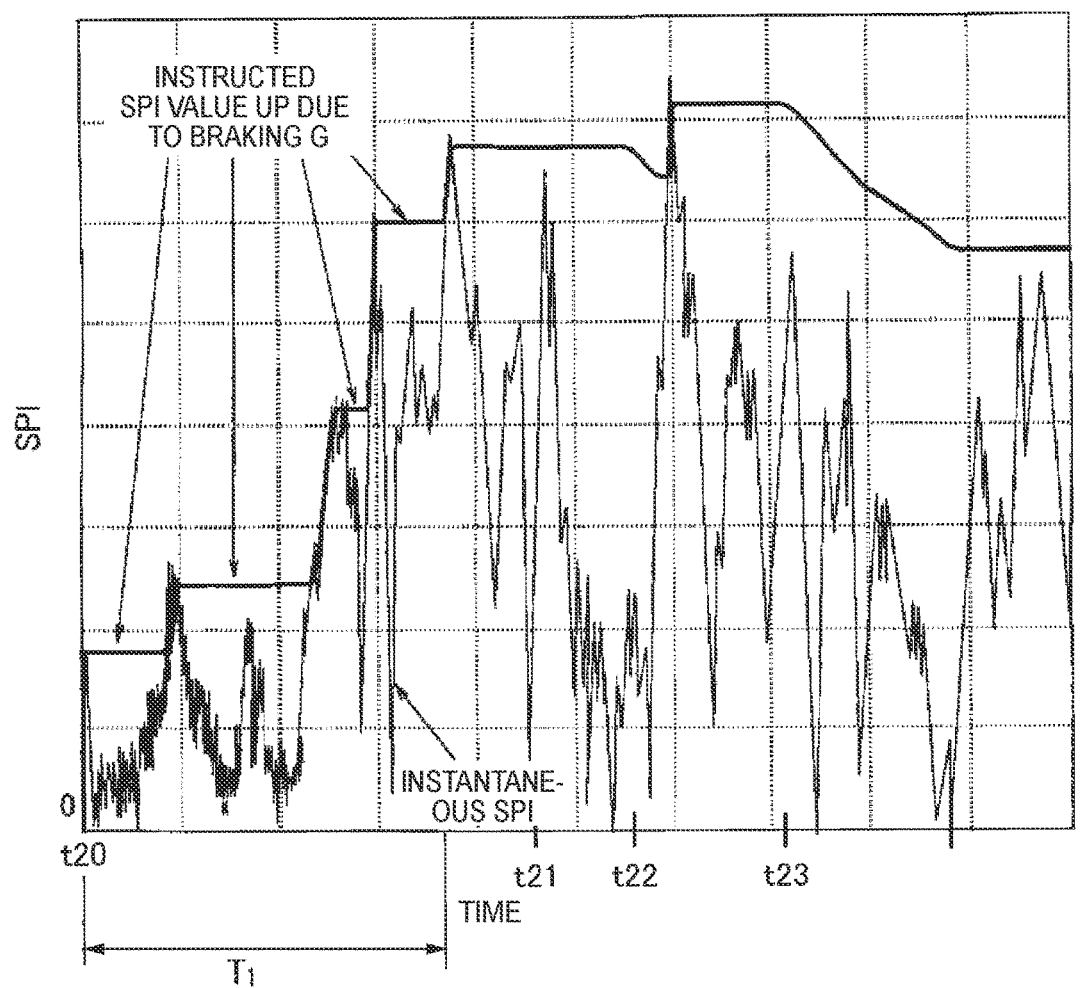
FIG. 14 is a diagram illustrating an example of an instantaneous SPI and an instructed SPI.

When the base engine rotation speed Nebas obtained using the base engine rotation speed setting map illustrated in FIG. 12 is corrected depending on a driver's taste, for example, the base engine rotation speed Nebas is considered to be corrected as follows. First, a driving taste parameter Pli is set using longitudinal acceleration Gx and lateral acceleration Gy from the acceleration sensor 92. A radius of a friction circle based on the longitudinal acceleration Gx and the lateral acceleration Gy may be calculated as an instantaneous sports index (SPI) and used as the driving taste parameter Pli, or an instructed SPI may be calculated based on the instantaneous SPI and used as the driving taste parameter Pli. Here, the instantaneous SPI can be calculated as a square root of a sum of a square of the longitudinal acceleration Gx and a square of the lateral acceleration Gy. The instructed SPI can be calculated based on the instantaneous SPI such that trackability of an increase in the instantaneous SPI becomes higher than trackability of a decrease in the instantaneous SPI. An example of the instantaneous SPI and the instructed SPI is illustrated in FIG. 14. As illustrated in the drawing, until the time T1 elapses from the time t20, the instantaneous SPI increases or decreases with a change in the longitudinal acceleration Gx or the lateral acceleration Gy due to braking turning or the like of the vehicle, and the instructed SPI instantaneous SPI increases with an increase in maximum value of the instantaneous SPI and is maintained. At time t22 or time t23, when the vehicle transitions from turning acceleration to linear acceleration, or the like and a decreasing condition of the instructed SPI is satisfied, the instructed SPI decreases. The decreasing condition of the instructed SPI is a condition in which a state in which maintaining of the instructed SPI is considered not to match a driver's intention starts, and examples thereof include a condition in which a state in which the instantaneous SPI is less than the instructed SPI is maintained over a predetermined time and a condition in which a time integral value of a difference between the instantaneous SPI and the instructed SPI is greater than a threshold value. When the driving taste parameter Pli is set in this way, the base engine rotation speed Nebas obtained using the base engine rotation speed setting map illustrated in FIG. 12 is corrected to increase as the driving taste parameter Pli increases. By correcting the base engine rotation speed Nebas in this way, the base engine rotation speed Nebas can be set to a value in which a driver's driving taste is reflected.

When the base engine rotation speed Nebas obtained using the base engine rotation speed setting map illustrated in FIG. 12 is corrected depending on whether the sport mode switch or the power mode switch is turned on or off, it is considered that the base engine rotation speed Nebas when any one of the sport mode switch and the power mode switch is turned on is higher than when both switches are turned off. By correcting the base engine rotation speed Nebas in this way, the base engine rotation speed Nebas can be set to a value in which the state of the sport mode switch or the power mode switch is reflected.

In the hybrid vehicle 20 according to the first embodiment, when the brake is turned on during travel at the D position in the driving feeling priority mode, the base engine rotation speed Nebas is set using the braking level Lv and the vehicle speed V. However, the base engine rotation speed Nebas may be set using only the braking level Lv without considering the vehicle speed V. Even when the vehicle speed V is not considered, as described above, the base engine rotation speed Nebas based on the braking level Lv may be corrected depending on a driver's driving taste or may be corrected depending on whether the sport mode switch or the power mode switch is turned on or off in a vehicle including such switches.

In the hybrid vehicle 20 according to the first embodiment, when the brake is turned on during travel at the D position in the driving feeling priority mode, a fixed value (a uniform value) is used as the threshold value Tdref3. However, the threshold value Tdref3 may be set using the road surface gradient θg and a threshold value setting map illustrated in FIG. 15, may be set depending on a driver's driving taste, or may be set depending on whether the sport mode switch or the power mode switch is turned on or off in a vehicle including such switches.

Figure 15:
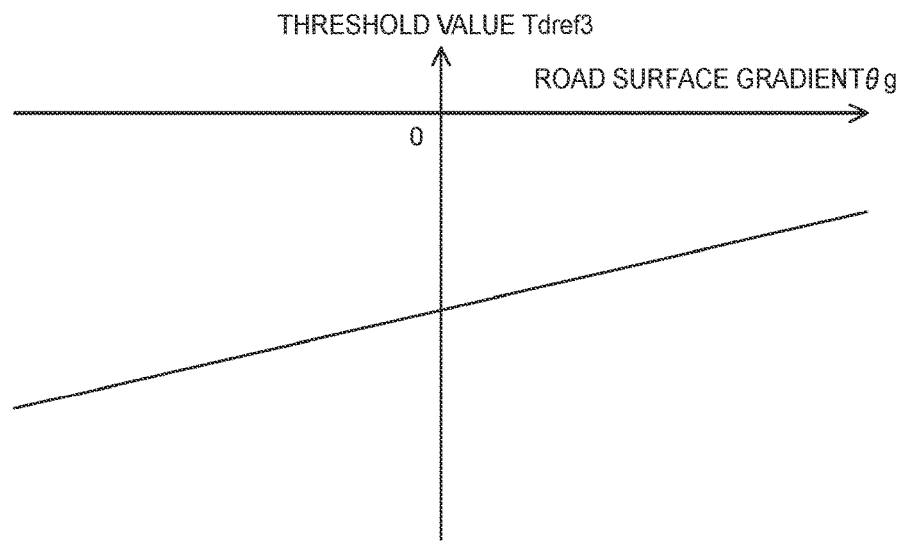
FIG. 15 is a diagram illustrating an example of a threshold value setting map.

When the threshold value Tdref3 is set using the road surface gradient θg and the threshold value setting map illustrated in FIG. 15, it is considered that the threshold value Tdref3 is set to increase (to decrease in an absolute value) as the road surface gradient θg increases (as a slope of an uphill road increases in the traveling direction) as illustrated in FIG. 15. As the road surface gradient θg increases, deceleration of the vehicle is likely to increase with the same effective driving force Td* (the effective braking force Tb*). Accordingly, by setting the threshold value Tdref3 with the tendency illustrated in FIG. 15, it is possible to appropriately switch the braking level Lv from level Lv1 to level Lv2 in consideration of the road surface gradient θg (the deceleration of the vehicle). The same idea is true of the threshold value Tdref1, the threshold value Tdref2, or the threshold value ΔTdref.

When the threshold value Tdref3 is set depending on a driver's driving taste, it is considered that the threshold value Tdref3 is set to increase as the driving taste parameter Pli increases. When the threshold value Tdref3 is corrected depending on whether the sport mode switch or the power mode switch is turned on nor off, it is considered that the threshold value Tdref3 when any one of the sport mode switch and the power mode switch is turned on is greater than when both switches are turned off. By setting the threshold value Tdref3 in this way, the threshold value Tdref3 can be set to a value in which a driver's driving taste or the state of the sport mode switch or the power mode switch is reflected. The same idea is true of the threshold value Tdref1, the threshold value Tdref2, or the threshold value ΔTdref.

Figure 16:
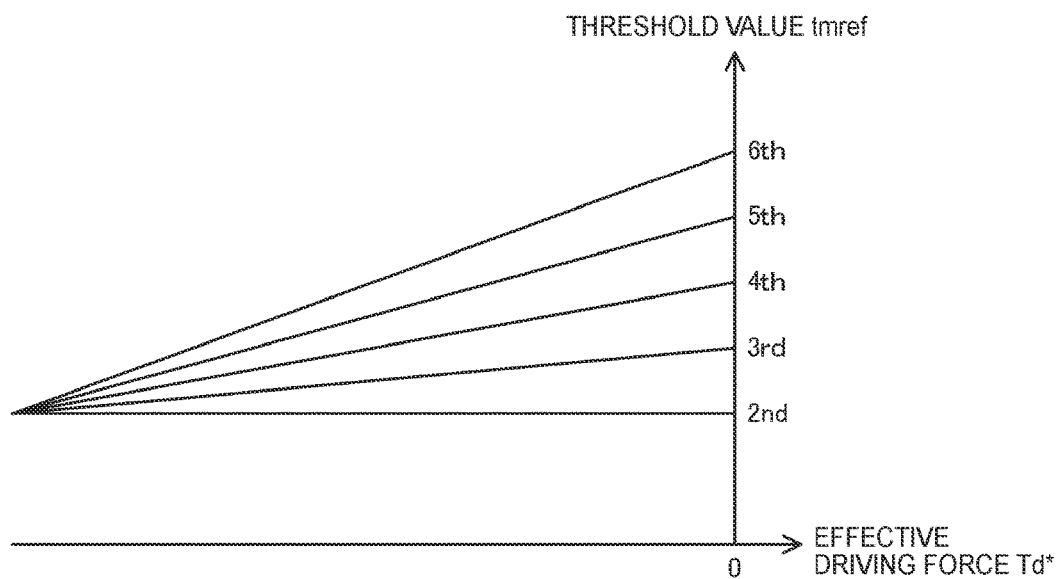
FIG. 16 is a diagram illustrating an example of a threshold value setting map.

In the hybrid vehicle 20 according to the first embodiment, when the brake is turned on during travel at the D position in the driving feeling priority mode, a fixed value (a uniform value) is used as the threshold value tmref. However, the threshold value tmref may be set using the effective driving force Td*, the shift stage set when this routine is previously performed (the previous M), and a threshold value setting map illustrated in FIG. 16. In this case, as illustrated in the drawing, the threshold value tmref is set to decrease as the effective driving force Td* decreases. The threshold value tmref is also set to increase as the shift stage set when this routine is previously performed (the previous M) increases. Accordingly, downshift of the shift stage M based on the effective driving force Td* (the effective braking force Tb*) and the shift stage M can be performed at a more appropriate timing. In this modified example, the threshold value tmref is set using the effective driving force Td* and the shift stage set when this routine is previously performed (the previous M), but may be set using only any one of the effective driving force Td* and the shift stage set when this routine is previously performed (the previous M) or may be set using the braking level Lv instead of the effective driving force Td*.

In the hybrid vehicle 20 according to the first embodiment, when the brake is turned on during travel at the D position, the motors MG1 and MG2 are controlled such that the engine 22 rotates at the target engine rotation speed Ne* using the motor MG1 and the effective driving force Td* (the effective braking force Tb*) is applied to the drive shaft 36. However, the engine 22 and the motors MG1 and MG2 may be controlled such that the engine 22 autonomously operates (non-load operations) at the target engine rotation speed Ne* and the effective driving force Td* is applied to the drive shaft 36.

In the hybrid vehicle 20 according to the first embodiment, when the accelerator is turned on at the D position in the driving feeling priority mode and the required driving force Tda is greater than the upper-limit driving force Tdlim in charging/discharging the battery 50, the upper-limit engine power Pelim is set by adding the charging/discharging required power Pb* to the temporary upper-limit engine power Pelim obtained from the upper-limit engine power setting map illustrated in FIG. 8, and a value obtained by subtracting the charging/discharging required power Pb* from the upper-limit engine power Pelim is set as the target engine power Pe*. However, the temporary upper-limit engine power Pelim obtained from the upper-limit engine power setting map illustrated in FIG. 8 may be set as the upper-limit engine power Pelim, the upper-limit driving force Tdlim is set by dividing a value, which is obtained by adding the charging/discharging required power Pb* to the upper-limit engine power Pelim, by the rotation speed Nd of the drive shaft 36, and the upper-limit engine power Pelim may be set as the target engine power Pe*. Both routines are different in only whether to consider the charging/discharging required power Pb* in calculating the upper-limit engine power Pelim or to consider the charging/discharging required power Pb* in calculating the upper-limit driving force Tdlim and the results thereof are identical to each other.

In the hybrid vehicle 20 according to the first embodiment, when the accelerator is turned on during travel at the D position in the driving feeling priority mode, the power for outputting the smaller driving force of the required driving force Tda and the upper-limit driving force Tdlim to the drive shaft 36 is set as the target engine power Pe*. However, the target engine power Pe* may be set such that the smaller of a power obtained by multiplying the required driving force Tda by the rotation speed Nd of the drive shaft 36 (Tda×Nd) and a power obtained by multiplying the upper-limit driving force Tdlim by the rotation speed Nd of the drive shaft 36 (Tdlim×Nd) is output to the drive shaft 36. That is, the process of Step S160 can be set to a process of comparing the power obtained by multiplying the required driving force Tda by the rotation speed Nd of the drive shaft 36 (Tda×Nd) by the power obtained by multiplying the upper-limit driving force Tdlim by the rotation speed Nd of the drive shaft 36 (Tdlim×Nd).

In the hybrid vehicle 20 according to the first embodiment, the mode switch 90 is provided and when the driving feeling priority mode is selected by the mode switch 90, the drivability priority drive control routine illustrated in FIG. 2 is performed when the accelerator is turned on and the drivability priority drive control routine illustrated in FIG. 9 is performed when the brake is turned on. However, the mode switch 90 may not be provided, and as normal drive control, the drivability priority drive control routine illustrated in FIG. 2 may be performed when the accelerator is turned on and the drivability priority drive control routine illustrated in FIG. 9 may be performed when the brake is turned on.

Figure 17:
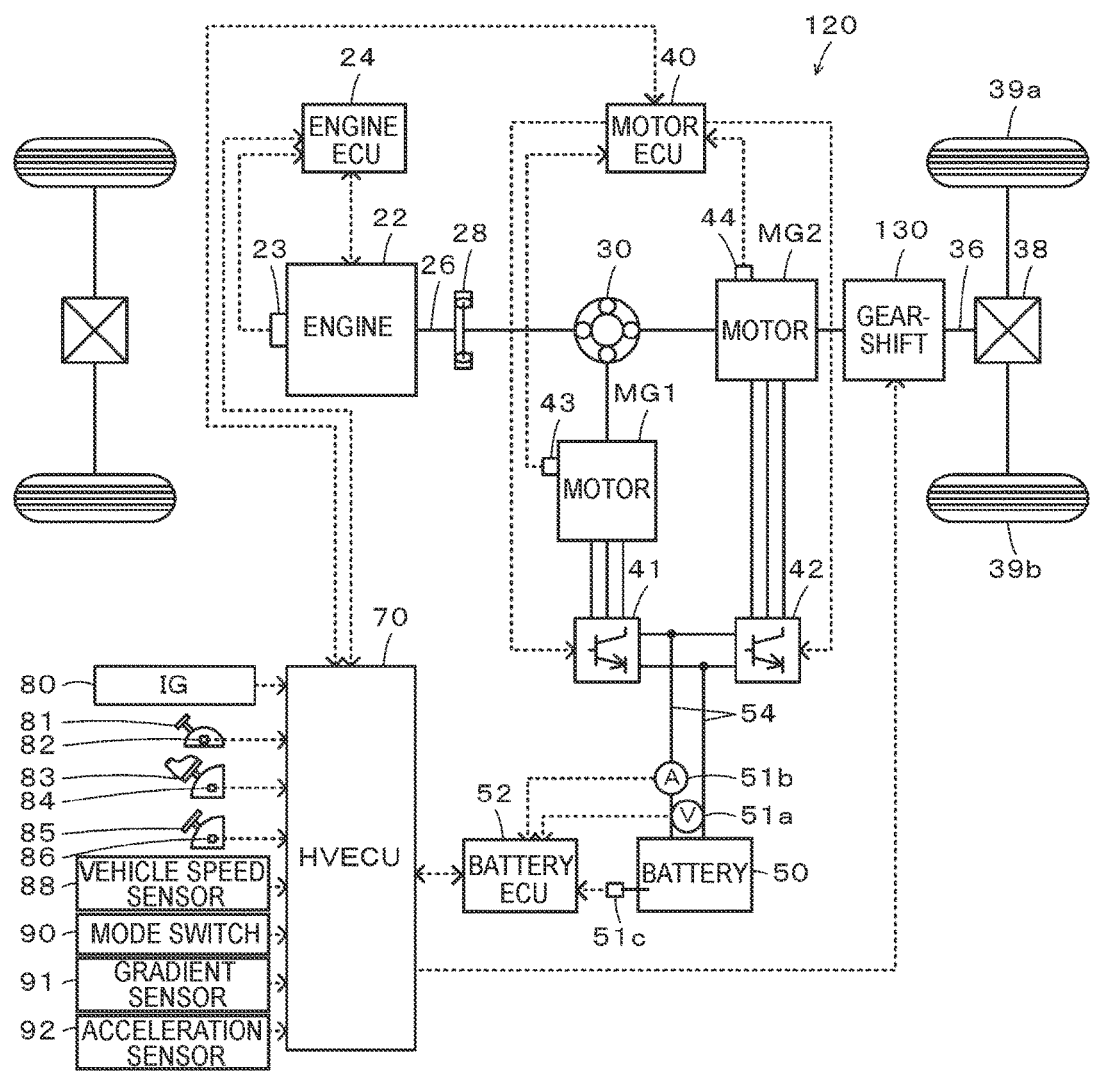
FIG. 17 is a diagram schematically illustrating a configuration of a hybrid vehicle 120 according to a second embodiment.

A hybrid vehicle 120 according to a second embodiment will be described below. The configuration of the hybrid vehicle 120 according to the second embodiment is schematically illustrated in FIG. 17. The hybrid vehicle 120 according to the second embodiment has the same configuration as the hybrid vehicle 20 according to the first embodiment illustrated in FIG. 1, except that a gearshift 130 is provided as illustrated in FIG. 17. For the purpose of omission of repeated description, the same elements in the hybrid vehicle 120 according to the second embodiment as in the hybrid vehicle 20 according to the first embodiment will be referenced by the same reference signs and detailed description thereof will not be repeated.

Figure 18:
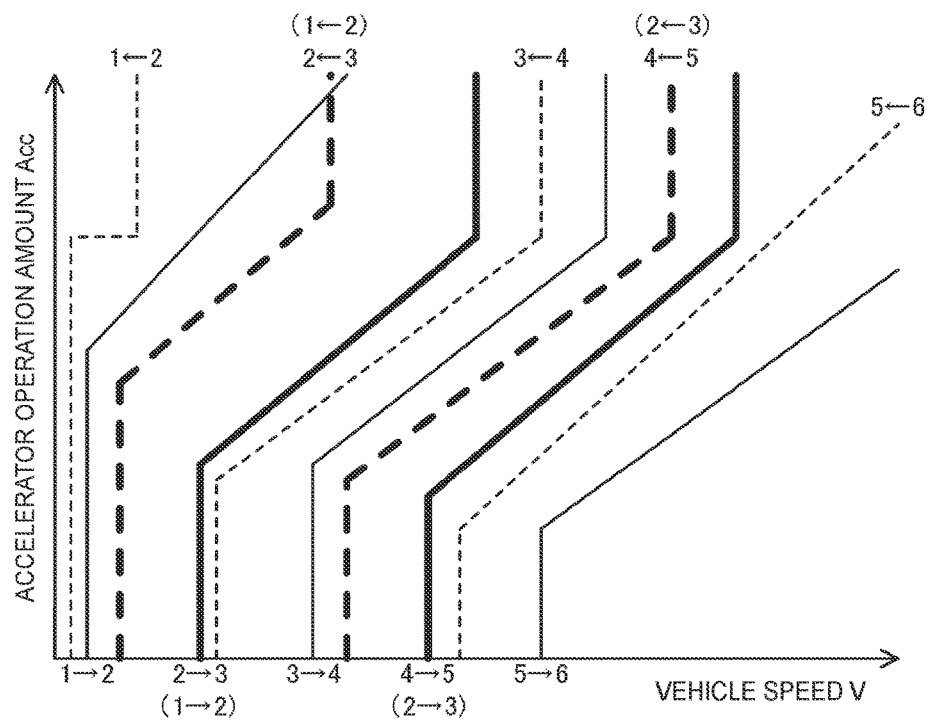
FIG. 18 is a diagram illustrating an example of a shift stage diagram which is used in the second embodiment.

The gearshift 130 included in the hybrid vehicle 120 according to the second embodiment is constituted by a stepped automatic gearshift of three shift stages in the driving direction which is hydraulically driven, and is shifted in accordance with a control signal from the HVECU 70. In the hybrid vehicle 120 according to the second embodiment, three virtual shift stages are set in addition to three shift stages of the gearshift 130 to constitute a gearshift of six shift stages. FIG. 18 illustrates an example of a shift stage diagram which is used in the second embodiment. For the purpose of easy comparison, the shift stage diagram illustrated in FIG. 18 is the same as the shift stage diagram illustrated in FIG. 6. In FIG. 18, thick solid lines denote upshift lines of the gearshift 130 and thick dotted lines denote downshift lines of the gearshift 130. Thin solid lines denote virtual upshift lines and thin dotted lines denote virtual downshift lines. In the drawing, numerals and arrows in the upper part and the lower part denote shift of six shift stages including the virtual shift stages, and numerals and arrows in parentheses in the upper part and the lower part denote shift of three shift stages of the gearshift 130. As illustrated in the drawing, one virtual shift stage is disposed between neighboring shift stages of the gearshift 130.

Figure 19:
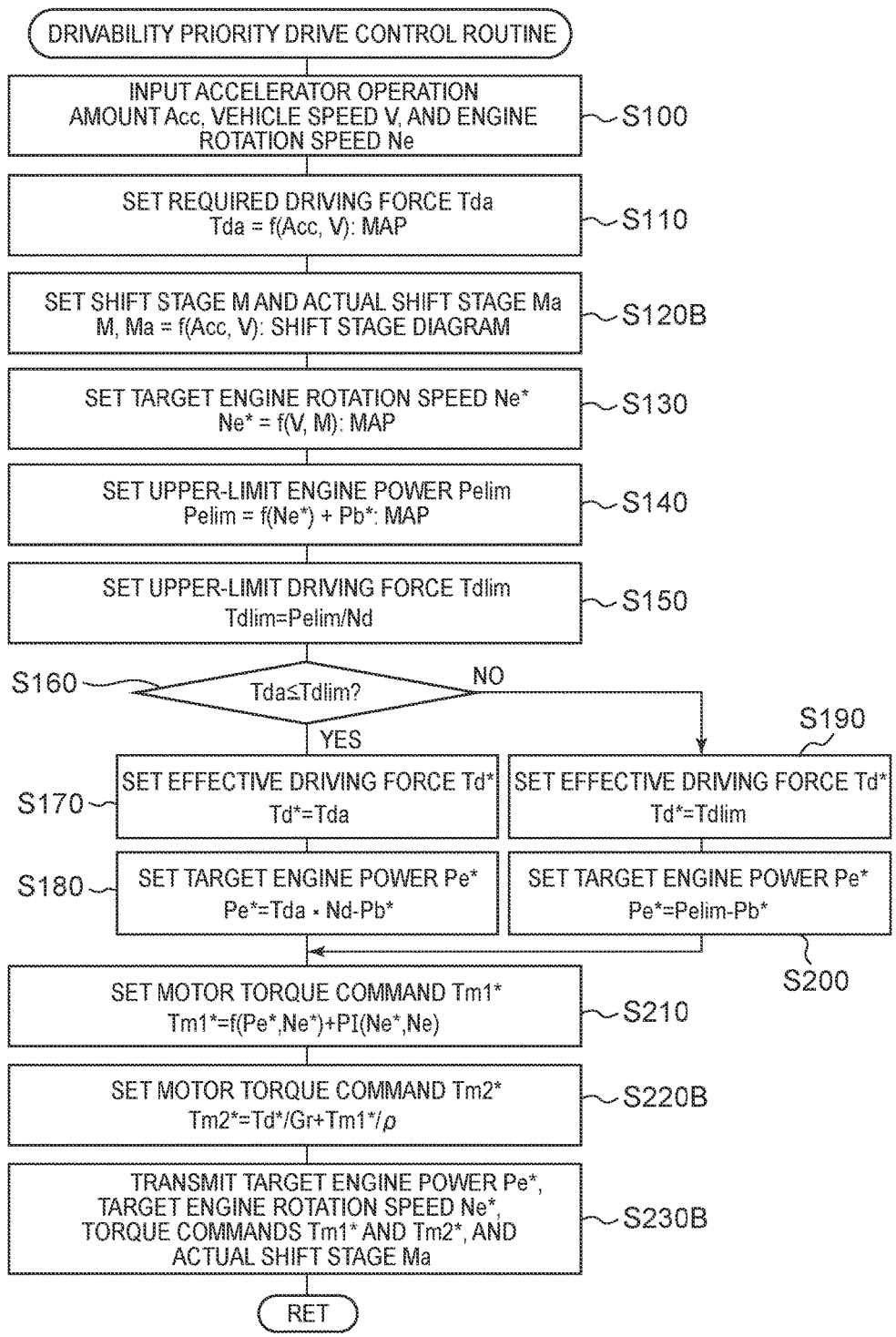
FIG. 19 is a flowchart illustrating an example of a drivability priority drive control routine which is performed by the HVECU 70 when an accelerator is turned on in a driving feeling priority mode and at a D position in the second embodiment.

In the hybrid vehicle 120 according to the second embodiment, when the accelerator is turned on at the D position in the driving feeling priority mode, a drivability priority drive control routine illustrated in FIG. 19 is performed. The drivability priority drive control routine illustrated in FIG. 19 is the same as the drivability priority drive control routine illustrated in FIG. 2, except for Step S120B of setting an actual shift stage Ma as well as the shift stage M, Step S220B of setting the torque command Tm2* of the motor MG2 using a gear ratio Gr of the actual shift stages Ma of the gearshift 130, and step S230B of transmitting the actual shift stage Ma to the gearshift 130 when transmitting the target engine power Pe* or the target engine rotation speed Ne*. Accordingly, the same processes in the drivability priority drive control routine illustrated in FIG. 19 as in the drivability priority drive control routine illustrated in FIG. 2 are referenced by the same step numbers. The drivability priority drive control routine illustrated in FIG. 19 will be described below in brief with a focus on differences from the drivability priority drive control routine illustrated in FIG. 2.

Figure 3:
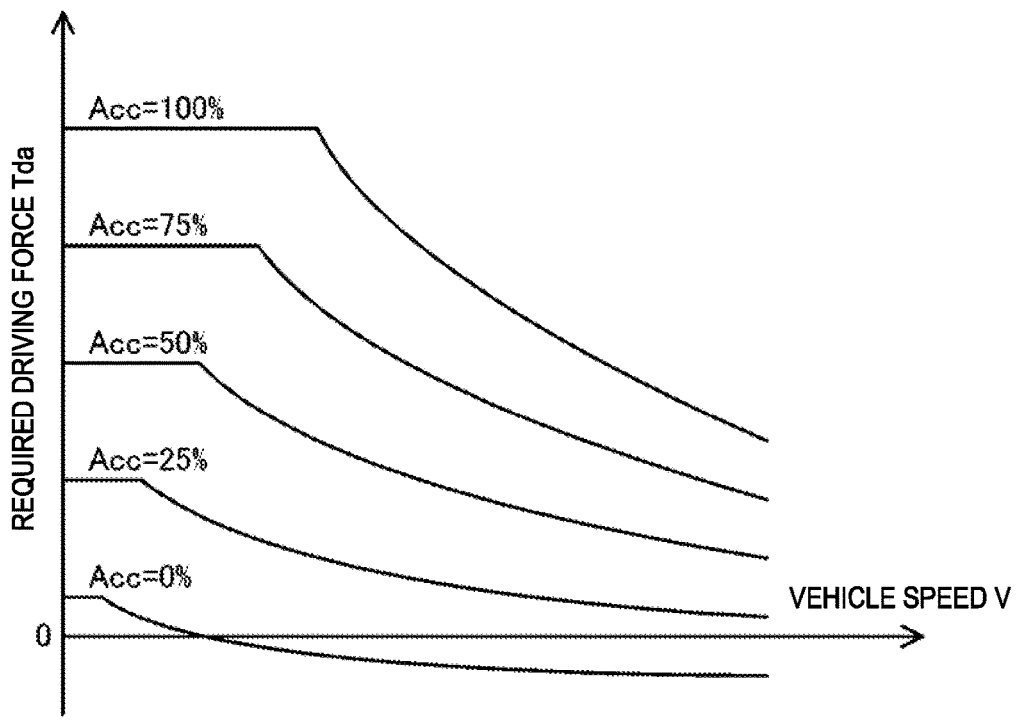
FIG. 3 is a diagram illustrating an example of a required driving force setting map.
Figure 4:
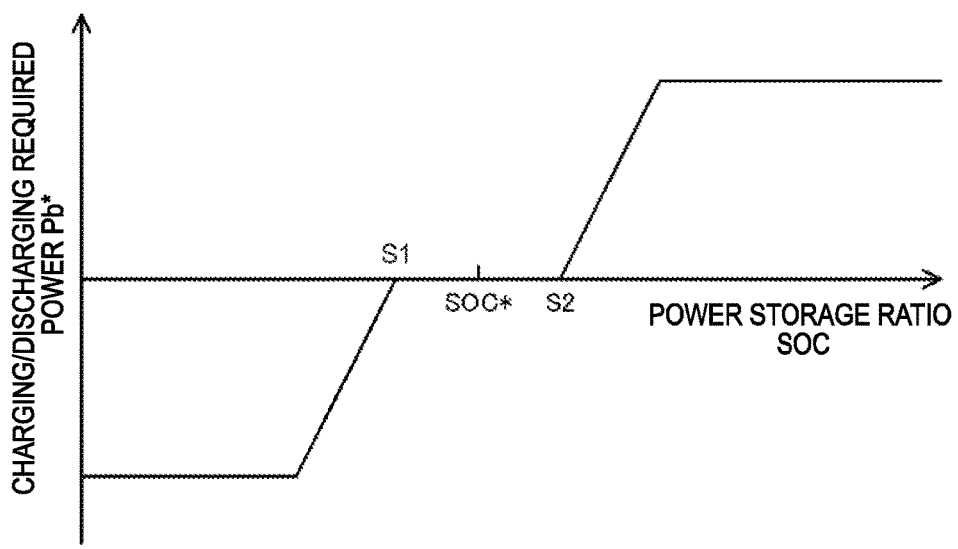
FIG. 4 is a diagram illustrating an example of a charging/discharging required power setting map.

When the drivability priority drive control routine illustrated in FIG. 19 is performed, the HVECU 70 first receives the accelerator operation amount Acc, the vehicle speed V, and the rotation speed Ne of the engine 22 (Step S100), and sets the required driving force Tda using the accelerator operation amount Acc, the vehicle speed V, and the required driving force setting map illustrated in FIG. 3 (Step S110). Subsequently, the shift stage M and the actual shift stage Ma are set using the accelerator operation amount Acc, the vehicle speed V, and the shift stage diagram illustrated in FIG. 18 (Step S120B). Here, the shift stage M means the six shift stages including the virtual shift stages, and the actual shift stage Ma means the three shift stages of the gearshift 130. Accordingly, the shift stage M is set to correspond to any one of the six shift stages based on all the shift stage lines in FIG. 18, and the actual shift stage Ma is set to correspond to any one of the three shift stages based on the thick solid lines and the thick dotted lines in FIG. 18.

Then, the target engine rotation speed Ne* is set using the vehicle speed V, the shift stage M, and the target engine rotation speed setting map illustrated in FIG. 7 (Step S130). The upper-limit engine power Pelim is set by adding the charging/discharging required power Pb* to the temporary upper-limit engine power Pelim which is obtained using the target engine rotation speed Ne* and the upper-limit engine power setting map illustrated in FIG. 7 (Step S140). The upper-limit driving force Tdlim is set by dividing the upper-limit engine power Pelim by the rotation speed Nd of the drive shaft 36 (Step S150), and the required driving force Tda and the upper-limit driving force Tdlim are compared (Step S160).

When the required driving force Tda is equal to or less than the upper-limit driving force Tdlim, the required driving force Tda is set as the effective driving force Td* (Step S170), and a value obtained by subtracting the charging/discharging required power Pb* from a value which is obtained by multiplying the required driving force Tda by the rotation speed Nd of the drive shaft 36 is set as the target engine power Pe* (Step S180). When the required driving force Tda is greater than the upper-limit driving force Tdlim, the upper-limit driving force Tdlim is set as the effective driving force Td* (Step S190) and a value obtained by subtracting the charging/discharging required power Pb* from the upper-limit engine power Pelim is set as the target engine power Pe* (Step S200).

Subsequently, the torque command Tm1* of the motor MG1 is set using Expression (2) (Step S210) and the torque command Tm2* of the motor MG2 is set using Expression (5) (Step S220B). In Expression (5), "Gr" denotes a gear ratio of the actual shift stages Ma of the gearshift 130. Accordingly, the first term on the right side of Expression (5) denotes a driving force to be output to an input shaft of the gearshift 130 so as to output the effective driving force Td* to the drive shaft 36 which is an output shaft of the gearshift 130.

$$Tm2^* = Td^*/Gr + Tm1^*/\rho \quad (5)$$

The target engine power Pe* and the target engine rotation speed Ne* are transmitted to the engine ECU 24, the torque commands Tm1* and Tm2* are transmitted to the motor ECU 40, the actual shift stage Ma is transmitted to the gearshift 130 (Step S230B), and then this routine ends. The gearshift 130 receiving the actual shift stage Ma maintains the shift stage when the shift stage is an actual shift stage Ma, and shifts such that the shift stage is an actual shift stage Ma when the shift stage is not an actual shift stage Ma.

Figure 20:
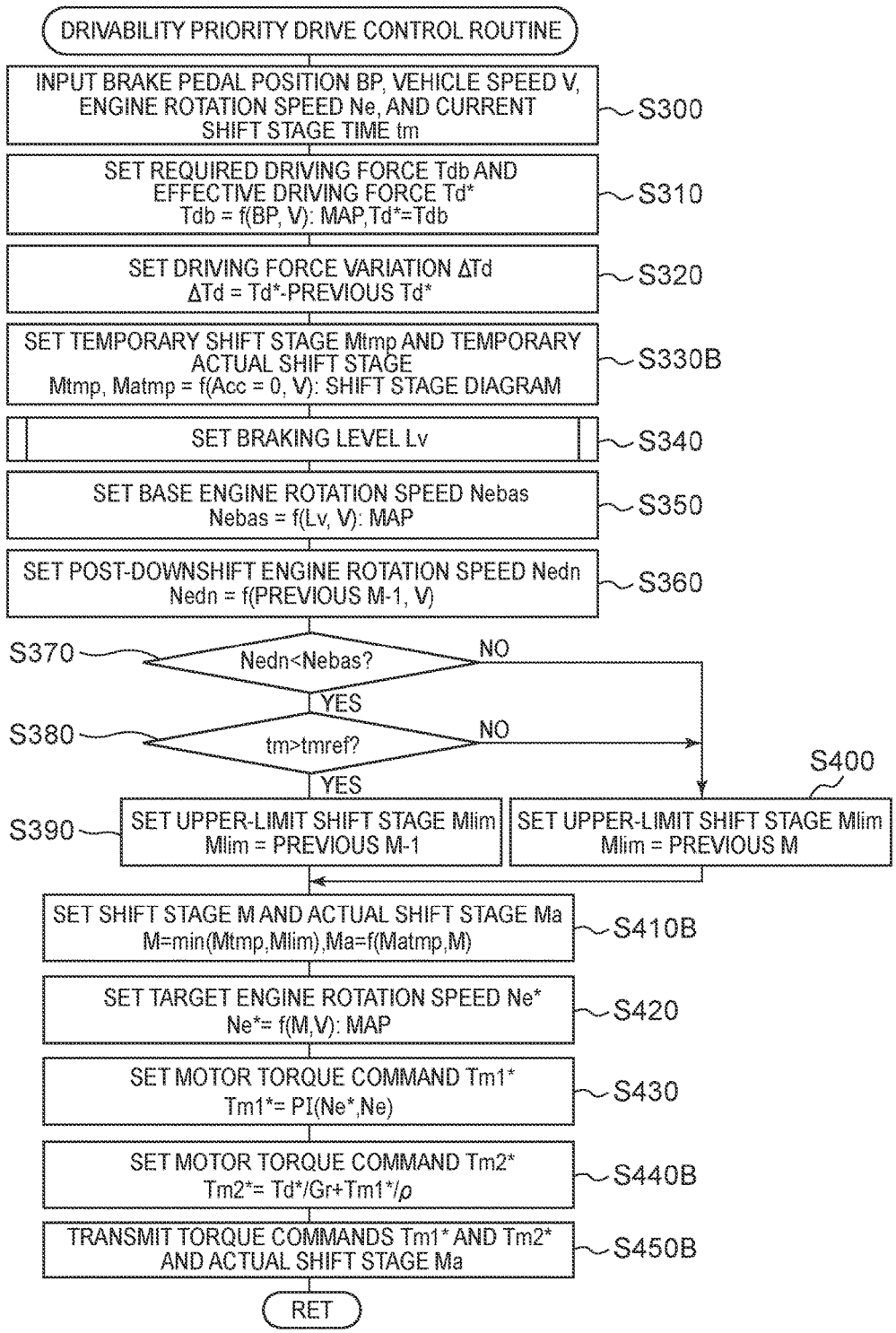
FIG. 20 is a flowchart illustrating an example of a drivability priority drive control routine which is performed by the HVECU 70 when a brake is turned on during travel in the driving feeling priority mode and at the D position in the second embodiment.

The operation when the brake is turned on during travel at the D position in the driving feeling priority mode will be described below. In the hybrid vehicle 120 according to the second embodiment, when the brake is turned on at the D position in the driving feeling priority mode, a drivability priority drive control routine illustrated in FIG. 20 is performed. The drivability priority drive control routine illustrated in FIG. 20 is the same as the drivability priority drive control routine illustrated in FIG. 9, except for Step S350B of setting a temporary actual shift stage Matmp as well as the temporary shift stage Mtmp, Step S410B of setting an actual shift stage Ma as well as the shift stage M, Step S440B of setting the torque command Tm2* of the motor MG2 using a gear ratio Gr of the actual shift stages Ma of the gearshift 130, and step S450B of transmitting the actual shift stage Ma to the gearshift 130 when transmitting the target engine power Pe* or the target engine rotation speed Ne*. Accordingly, the same processes in the drivability priority drive control routine illustrated in FIG. 20 as in the drivability priority drive control routine illustrated in FIG. 9 are referenced by the same step numbers. The drivability priority drive control routine illustrated in FIG. 20 will be described below in brief with a focus on differences from the drivability priority drive control routine illustrated in FIG. 9.

When the drivability priority drive control routine illustrated in FIG. 20 is performed, the HVECU 70 first receives the brake pedal position BP, the vehicle speed V, the rotation speed Ne of the engine 22, and the current shift stage time tm (Step S300), sets a required driving force Tdb using the brake pedal position BP, the vehicle speed V, and the required driving force setting map illustrated in FIG. 10, sets the set required driving force Tdb as the effective driving force Td* (Step S310), and sets the driving force variation ΔTd using the set effective driving force Td* and the previous effective driving force (the previous Td*) (Step S320).

Subsequently, the temporary shift stage Mtmp and the temporary actual shift stage Matmp are set using the accelerator operation amount Acc with a value 0, the vehicle speed V, and the shift stage diagram (Step S330B). In this case, a diagram in which the "shift stage M" and the "actual shift stage Ma" in the shift stage diagram illustrated in FIG. 18 are replaced with a "temporary shift stage Mtmp" and a "temporary actual shift stage Matmp" can be used as the shift stage diagram.

Then, the braking level Lv is set by the braking level setting process illustrated in FIG. 11 (Step S340), and the base engine rotation speed Nebas is set using the set braking level Lv, the vehicle speed V, and the base engine rotation speed setting map illustrated in FIG. 12 (Step S350). The post-downshift engine rotation speed Nedn is set using a shift stage (a previous M−1) one step lower than the shift stage which is set when this routine is previously performed (a previous M), the vehicle speed V, and a post-downshift engine rotation speed setting map (Step S360).

Then, the post-downshift engine rotation speed Nedn is compared with the base engine rotation speed Nebas (Step S370). When the post-downshift engine rotation speed Nedn is lower than the base engine rotation speed Nebas, the current shift stage time tm is compared with the threshold value tmref (Step S380).

When the post-downshift engine rotation speed Nedn is equal to or higher than the base engine rotation speed Nebas or when the post-downshift engine rotation speed Nedn is less than the base engine rotation speed Nebas but the current shift stage time tm is equal to or less than the threshold value tmref, the shift stage set when this routine is previously performed (the previous M) is set as the upper-limit shift stage Mlim (Step S400). When the post-downshift engine rotation speed Nedn is less than the base engine rotation speed Nebas and the current shift stage time tm is greater than the threshold value tmref, a shift stage one step lower than the shift stage set when this routine is previously performed (the previous M) is set as the upper-limit shift stage Mlim (Step S390).

The smaller of the temporary shift stage Mtmp and the upper-limit shift stage Mlim is set as the shift stage M, and the actual shift stage Ma is set based on the temporary actual shift stage Matmp or the shift stage M (Step S410B). Regarding the actual shift stage Ma, the temporary actual shift stage Matmp is set as the actual shift stage Ma when the temporary shift stage Mtmp is set as the shift stage M, and the actual shift stage Ma is set based on the shift stage M when the upper-limit shift stage Mlim is set as the shift stage M. In the latter, the actual shift stage Ma is set based on the shift stage M to match the relationship between the shift stage M and the actual shift stage Ma in the shift stage diagram illustrated in FIG. 18 (for example, the actual shift stage Ma is set to the second stage when the shift stage M is the third stage or the fourth stage).

Subsequently, the target engine rotation speed Ne* is set using the shift stage M, the vehicle speed V, and the target engine rotation speed setting map illustrated in FIG. 7 (Step S420), the torque command Tm1* of the motor MG1 is set using Expression (4) (Step S430), and the torque command Tm2* of the motor MG2 is set using Expression (5) (Step S440B). Then, the torque commands Tm1* and Tm2* of the motors MG1 and MG2 are transmitted to the motor ECU 40, the actual shift stage Ma is transmitted to the gearshift 130 (Step S450B), and then this routine ends.

Since the above-mentioned hybrid vehicle 120 according to the second embodiment functions in the same way as the hybrid vehicle 20 according to the first embodiment, the same advantages as achieved in the hybrid vehicle 20 according to the first embodiment can be achieved. That is, when the accelerator is turned on at the D position in the driving feeling priority mode or when the brake is turned on during travel at the D position in the driving feeling priority mode, it is possible to give a better driving feeling to a driver.

In the hybrid vehicle 120 according to the second embodiment, the gearshift 130 of three shift stages is provided to constitute six shift stages including the virtual shift stages, but the gearshift 130 is not limited to the three shift stages and may have two shift stages or may have four or more shift stages. One virtual shift stage is disposed between neighboring shift stages of the gearshift, but a desired number of virtual shift stages such as one shift stage or two shift stages may be disposed in each shift stage of the gearshift or a desired number of virtual shift stages may be disposed in only a specific shift stage of the gearshift. The virtual shift stages may not be provided.

In the embodiments, the engine 22 is an example of the "engine," and the motor MG1 is an example of the "first motor." The drive shaft 36 is an example of the "drive shaft." The planetary gear 30 is an example of the "planetary gear mechanism." The motor MG2 is an example of the "second motor." The battery 50 is an example of the "battery." The HVECU 70, the engine ECU 24, and the motor ECU 40 are examples of the "electronic control unit."

These examples are examples for specifically describing the embodiments of the disclosure and thus do not limit elements of the disclosure. That is, the embodiments are only specific examples of the disclosure.

While aspects of the disclosure have been described above with reference to the embodiments, but the disclosure is not limited to the embodiments and can be modified in various forms without departing from the gist of the disclosure.

The disclosure is applicable to the industry of manufacturing a hybrid vehicle.

What is claimed is:

1. A hybrid vehicle comprising
   an engine,
   a first motor,
   a planetary gear mechanism including three rotary elements, the three rotary elements being connected to three shafts respectively, the three shaft being an output shaft of the engine, a rotary shaft of the first motor, and a drive shaft connected to an axle,
   a second motor configured to input and output a power to and from the drive shaft,
   a battery configured to exchange electric power with the first motor and the second motor, and
   as a result of an electronic control unit determining that a brake of the hybrid vehicle is turned on during travel of the hybrid vehicle, the electronic control unit configured to:
      set a required braking force required for the drive shaft based on a brake depression amount;
      set a base rotation speed of the engine based on the required braking force;
      set a shift stage based on the base rotation speed and a vehicle speed;
      set a target rotation speed of the engine based on the shift stage and the vehicle speed; and
      control the engine, the first motor, and the second motor such that the engine operates at the target rotation speed and the required braking force acts on the drive shaft.

2. The hybrid vehicle according to claim 1, wherein
   as a result of the electronic control unit determining that the brake is turned on, the electronic control unit is configured to:
      set a braking level based on the required braking force; and
      set the base rotation speed such that the base rotation speed when the braking level is high is higher than the base rotation speed when the braking level is low.

3. The hybrid vehicle according to claim 2, wherein
   as a result of the electronic control unit determining that:
      (i) the braking level is a first level, which occurs when the brake is turned on; and
      (ii) the required braking force is equal to or greater than a first braking force for a first predetermined time or longer,
   the electronic control unit is configured to switch the braking level to a second level higher than a first level, and
   as a result of the electronic control unit determining that:
      (iii) the braking level is the second level, which occurs when the brake is turned on; and
      (iv) the required braking force is less than a second braking force for a second predetermined time or longer, the second braking force is equal to or less than the first braking force,
   the electronic control unit is configured to switch the braking level to the first level.

4. The hybrid vehicle according to claim 3, wherein the first braking force is set to decrease as a road surface gradient increases on an uphill road.

5. The hybrid vehicle according to claim 3, wherein
   as a result of the electronic control unit determining that:
      (i) the braking level is one of the first level and the second level, which occurs when the brake is turned on; and
      (ii) the required braking force is equal to or greater than a third braking force, the third braking force is equal to or greater than the second braking force; and
      (iii) an increase in the required braking force is equal to or greater than a predetermined increase,
   the electronic control unit is configured to switch the braking level to a third level, and
   as a result of the electronic control unit determining that:
      (iv) the braking level is the third level, which occurs when the brake is turned on; and
      (v) the required braking force is less than the second braking force for the second predetermined time or longer,
   the electronic control unit is configured to switch the braking level to the first level.

6. The hybrid vehicle according to claim 1, wherein
   as a result of the electronic control unit determining that the brake is turned on, the electronic control unit is configured to:
      set a temporary shift stage based on the vehicle speed;
      set a post-downshift rotation speed based on the vehicle speed, the post-downshift rotation speed is the rotation speed of the engine at a shift stage one step lower than a current shift stage;
      set the current shift stage as an upper-limit shift stage when the post-downshift rotation speed is higher than the base rotation speed;
      set a shift stage one step lower than the current shift stage as the upper-limit shift stage when the post-downshift rotation speed is equal to or lower than the base rotation speed; and
      set the smaller of the temporary shift stage and the upper-limit shift stage as the shift stage.

7. The hybrid vehicle according to claim 6, wherein
   as a result of the electronic control unit determining that:
      (i) the post-downshift rotation speed is equal to or lower than the base rotation speed when the electronic control unit determines that the brake is turned on; and
      (ii) a duration of the current shift stage is less than a third predetermined time,
   the electronic control unit is configured to set the current shift stage as the upper-limit shift stage.

8. The hybrid vehicle according to claim 1, wherein, as a result of the electronic control unit determining that the brake is turned on, the electronic control unit is configured to set the base rotation speed such that the base rotation speed when the vehicle speed is low is less than the base rotation speed when the vehicle speed is high.

9. The hybrid vehicle according to claim 1, wherein, as a result of the electronic control unit determining that an accelerator of the hybrid vehicle is turned on, the electronic control unit is configured to:
set a required driving force required for the drive shaft based on an accelerator depression amount;
set the shift stage based on the accelerator depression amount and the vehicle speed;
set the target rotation speed based on the vehicle speed and the shift stage;
set an upper-limit driving force, the upper-limit driving force being a driving force when an upper-limit power which is output from the engine when the engine rotates at the target rotation speed is output to the drive shaft; and
control the engine, the first motor, and the second motor such that the smaller driving force of the upper-limit driving force and the required driving force is output to the drive shaft and the engine rotates at the target rotation speed.

10. The hybrid vehicle according to claim 1, wherein the shift stage is a virtual shift stage.

11. The hybrid vehicle according to claim 1, further comprising a stepped gearshift attached between the drive shaft and the planetary gear mechanism,
wherein the shift stage is a shift stage of the stepped gearshift or a shift stage obtained by adding a virtual shift stage to the shift stage of the stepped gearshift.

12. A control method of a hybrid vehicle, the hybrid vehicle including an engine, a first motor, a planetary gear mechanism including three rotary elements, a second motor, a battery, and an electronic control unit,
the three rotary elements being connected to three shafts respectively, the three shafts being an output shaft of the engine, a rotary shaft of the first motor, and a drive shaft connected to an axle,
the second motor being configured to input and output a power to and from the drive shaft,
the battery being configured to exchange electric power with the first motor and the second motor,
the control method comprising
determining, by the electronic control unit, whether or not a brake of the hybrid vehicle is turned on during travel of the hybrid vehicle, as a result of the electronic control unit determining that the brake is turned on, the control method further comprising:
setting, by the electronic control unit, a required braking force required for the drive shaft based on a brake depression amount;
setting, by the electronic control unit, a base rotation speed of the engine based on the required braking force;
setting, by the electronic control unit, a shift stage based on the base rotation speed and a vehicle speed;
setting, by the electronic control unit, a target rotation speed of the engine based on the shift stage and the vehicle speed; and
controlling, by the electronic control unit, the engine, the first motor, and the second motor such that the engine operates at the target rotation speed and the required braking force acts on the drive shaft.

* * * * *